US011955071B2

(12) United States Patent
Zhao et al.

(10) Patent No.: US 11,955,071 B2
(45) Date of Patent: Apr. 9, 2024

(54) PIXEL CIRCUIT, DISPLAY PANEL AND METHOD FOR DRIVING A PIXEL CIRCUIT

(71) Applicant: KUNSHAN GO-VISIONOX OPTO-ELECTRONICS CO., LTD, Jiangsu (CN)

(72) Inventors: Dongfang Zhao, Kunshan (CN); Zhe Du, Kunshan (CN); Junfeng Li, Kunshan (CN); Gang Wang, Kunshan (CN); Yong Ge, Kunshan (CN)

(73) Assignee: KUNSHAN GO-VISIONOX OPTO-ELECTRONICS CO., LTD, Kunshan (CN)

(*) Notice: Subject to any disclaimer, the term of this patent is extended or adjusted under 35 U.S.C. 154(b) by 167 days.

(21) Appl. No.: 17/692,050

(22) Filed: Mar. 10, 2022

(65) Prior Publication Data

US 2022/0199010 A1 Jun. 23, 2022

Related U.S. Application Data

(63) Continuation of application No. PCT/CN2021/070388, filed on Jan. 6, 2021.

(30) Foreign Application Priority Data

Mar. 25, 2020 (CN) ......................... 202010218767.7

(51) Int. Cl.
*G09G 5/00* (2006.01)
*G09G 3/3225* (2016.01)

(52) U.S. Cl.
CPC ... *G09G 3/3225* (2013.01); *G09G 2310/0297* (2013.01); *G09G 2310/08* (2013.01); *G09G 2320/0257* (2013.01)

(58) Field of Classification Search
CPC .. G09G 3/3225; G09G 3/3413; G09G 3/3258; G09G 3/3291; G09G 2310/0297;
(Continued)

(56) References Cited

U.S. PATENT DOCUMENTS

2017/0092167 A1 3/2017 Chaji et al.
2018/0166025 A1* 6/2018 Zhou .................... G09G 3/3233
(Continued)

FOREIGN PATENT DOCUMENTS

CN 103236237 A 8/2013
CN 103578404 A 2/2014
(Continued)

OTHER PUBLICATIONS

International Search Report dated Mar. 24, 2021 in corresponding International Application No. PCT/CN2021/070388; 4 pages.
(Continued)

*Primary Examiner* — Jennifer T Nguyen
(74) *Attorney, Agent, or Firm* — Maier & Maier, PLLC

(57) ABSTRACT

A pixel circuit, a display panel and a method for driving the pixel circuit. The pixel circuit includes a first light emission control module and a gate initialization module. The first light emission control module includes a control terminal, a first terminal and a second terminal, where the control terminal of the first light emission control module is electrically connected with a first light emission control signal, the first terminal of the first light emission control module is electrically connected with a first power signal, and the second terminal of the first light emission control module is electrically connected to the first electrode of the drive transistor.

13 Claims, 17 Drawing Sheets

(58) Field of Classification Search
CPC ....... G09G 2310/08; G09G 2320/0257; G09G 2320/045
USPC ........................................................ 345/214
See application file for complete search history.

(56) References Cited

U.S. PATENT DOCUMENTS

| | | | | |
|---|---|---|---|---|
| 2020/0312223 | A1* | 10/2020 | Yuan | G09G 3/32 |
| 2020/0342813 | A1* | 10/2020 | Gao | G09G 3/3291 |
| 2021/0217364 | A1* | 7/2021 | Wang | G09G 3/3291 |

FOREIGN PATENT DOCUMENTS

| | | | |
|---|---|---|---|
| CN | 103927981 | A | 7/2014 |
| CN | 104409051 | A | 3/2015 |
| CN | 105469741 | A | 4/2016 |
| CN | 105810145 | A | 7/2016 |
| CN | 107154239 | A | 9/2017 |
| CN | 107274830 | A | 10/2017 |
| CN | 107767819 | A | 3/2018 |
| CN | 109599062 | A | 4/2019 |
| CN | 109830208 | A | 5/2019 |
| CN | 110047431 | A | 7/2019 |
| CN | 111383596 | A | 7/2020 |
| JP | 2018049296 | A | 3/2018 |
| KR | 20160100433 | A | 8/2016 |

OTHER PUBLICATIONS

First Office Action dated Nov. 20, 2020 in corresponding Chinese Application No. 202010218767.7; 20 pages.

Second Office Action dated Mar. 25, 2021 in corresponding Chinese Application No. 202010218767.7; 26 pages.

Notice of Rejection dated Jul. 19, 2021 in corresponding Chinese Application No. 202010218767.7; 15 pages.

* cited by examiner

PIXEL CIRCUIT, DISPLAY PANEL AND METHOD FOR DRIVING A PIXEL CIRCUIT

CROSS-REFERENCE TO RELATED APPLICATION

This is a continuation of International Patent Application No. PCT/CN2021/070388, filed on Jan. 6, 2021, which claims priority to Chinese Patent Application No. 202010218767.7 filed with the CNIPA on Mar. 25, 2020, the disclosure of which is incorporated herein by reference in its entirety.

TECHNICAL FIELD

The present disclosure relates to the field of display technology, particularly to a pixel circuit, a display panel and a method for driving the pixel circuit.

BACKGROUND

With the continuous development of display technologies, a display panel is widely applied, and the people's requirements for the display panel are getting higher and higher. The image quality of the display panel is always one of important indexes for consumers and panel manufacturers to measure the quality of the display panel. A display panel usually includes a plurality of pixel circuits and a plurality of light emission devices, and the pixel circuits drive the light emission devices to emit light for display. However, an image-sticking phenomenon exists in the display panel, which impacts the display effect of the display panel.

SUMMARY

The present disclosure provides a pixel circuit, a display panel and a method for driving the pixel circuit to improve an image-sticking problem and the display effect of the display panel.

A pixel circuit is provided and includes a drive transistor, a first light emission control module, a second light emission control module and a gate initialization module.

The drive transistor includes a gate electrode, a first electrode and a second electrode.

The first light emission control module includes a control terminal, a first terminal and a second terminal; where the control terminal of the first light emission control module is electrically connected with a first light emission control signal, the first terminal of the first light emission control module is electrically connected to a first power signal, and the second terminal of the first light emission control module is electrically connected to the first electrode of the drive transistor.

The second light emission control module includes a control terminal, a first terminal and a second terminal; where the control terminal of the second light emission control module is electrically connected with a second light emission control signal, the first terminal of the second light emission control module is electrically connected to the second electrode of the drive transistor, and the second terminal of the second light emission control module is electrically connected to a light emission device.

The gate initialization module includes a control terminal, a first terminal and a second terminal; where the control terminal of the gate initialization module is electrically connected with an initialization control signal, the first terminal of the gate initialization module is electrically connected with an initialization voltage signal, and the second terminal of the gate initialization module is electrically connected to the gate electrode of the drive transistor.

As can be seen from the above technical solution, the present disclosure provides a pixel circuit structure, where the first light emission control module and the second light emission control module in the pixel circuit are controlled by using different light emission control signals. Thus, the first light emission control module and the second light emission control module can be on and off in different stages. The present disclosure ensures that the first light emission control module is on and the second light emission control module is off while the gate initialization module is on, so as to initialize the gate electrode and the source electrode of the drive transistor at the same time. That is, when the gate electrode of the drive transistor is electrically connected with a fixed potential, a fixed potential is also accessed to the source electrode of the drive transistor, and the gate electrode and the source electrode of the drive transistor in different working states in a previous frame are forced to reset at the same time, so that the drive transistor can be fully reset, and the working states of the drive transistor are consistent in the subsequent stages, thus improving the image-sticking phenomenon of the display panel.

In an embodiment, the first light emission control module further includes a first transistor, a gate electrode of the first transistor is electrically connected with the first light emission control signal, a first electrode of the first transistor is electrically connected with the first power signal, and a second electrode of the first transistor is electrically connected to the first electrode of the drive transistor.

The second light emission control module further includes a second transistor, a gate electrode of the second transistor is electrically connected with the second light emission control signal, a first electrode of the second transistor is electrically connected to the second electrode of the drive transistor, and a second electrode of the second transistor is electrically connected to an anode of the light emission device.

The gate initialization module further includes a third transistor, a gate electrode of the third transistor is electrically connected with the initialization control signal, a first electrode of the third transistor is electrically connected with the initialization voltage signal, and a second electrode of the third transistor is electrically connected to the gate electrode the drive transistor.

In the present disclosure, the first light emission control module, the second light emission control module and the gate initialization module are configured to each include one transistor, which is beneficial to reduce the number of transistors in the pixel circuit, thereby simplifying the structure of the pixel circuit.

In an embodiment, the pixel circuit further includes a fourth transistor, a fifth transistor and a sixth transistor.

A gate electrode of the fourth transistor is electrically connected with a first scanning signal, a first electrode of the fourth transistor is electrically connected to the second electrode of the drive transistor, and a second electrode of the fourth transistor is electrically connected to the gate electrode of the drive transistor.

A gate electrode of the fifth transistor is electrically connected with a second scanning signal, a first electrode of the fifth transistor is electrically connected with a reference voltage signal, and a second electrode of the fifth transistor is electrically connected to the second electrode of the drive transistor.

A gate electrode of the sixth transistor is electrically connected with a third scanning signal, a first electrode of the sixth transistor is electrically connected with a data signal, and a second electrode of the sixth transistor is electrically connected to the first electrode of the drive transistor.

The pixel circuit constitutes a 7 Transistors 1 Capacitor (7T1C) circuit, where the fourth transistor is not only used as a transistor in a data write module, but also multiplexed as a transistor in a second gate initialization module. The fifth transistor is not only used as a transistor in the second gate initialization module, but also multiplexed as a transistor in an anode initialization module. Therefore, the present disclosure implements more functions by using fewer transistors.

In an embodiment, the pixel circuit further includes a seventh transistor, where a gate electrode of the seventh transistor is electrically connected with the second scanning signal, a first electrode of the seventh transistor is electrically connected with the reference voltage signal, and a second electrode of the seventh transistor is electrically connected to the anode of the light emission device. The pixel circuit is a 8T1C circuit, where the fourth transistor is not only used as a transistor in a data write module, but also multiplexed as a transistor in a second gate initialization module. Therefore, the present disclosure implements more functions by using fewer transistors.

In an embodiment, the first scanning signal is multiplexed as the initialization control signal, or the second scanning signal is multiplexed as the initialization control signal. With such arrangement, the number of control signal lines can be reduced, which is beneficial to simplify the wiring of the display panel. At the same time, reducing the number of control signal lines can simplify the design of a scanning drive circuit, which is beneficial to the narrow frame design of the display panel.

In an embodiment, the pixel circuit further includes a fourth transistor, a fifth transistor and a sixth transistor.

A gate electrode of the fourth transistor is electrically connected with a first scanning signal, a first electrode of the fourth transistor is electrically connected to the second electrode of the drive transistor, and a second electrode of the fourth transistor is electrically connected to the gate electrode of the drive transistor.

A gate electrode of the fifth transistor is electrically connected with a first scanning signal, a first electrode of the fifth transistor is electrically connected with a reference voltage signal, and a second electrode of the fifth transistor is electrically connected to the second electrode of the drive transistor.

A gate electrode of the sixth transistor is electrically connected with a second scanning signal, a first electrode of the sixth transistor is electrically connected with a data signal, and a second electrode of the sixth transistor is electrically connected to the first electrode of the drive transistor.

The pixel circuit is a 7T1C circuit, where the fourth transistor is not only used as a transistor in a data write module, but also multiplexed as a transistor in a second gate initialization module.

The fifth transistor is not only used as a transistor in the second gate initialization module, but also multiplexed as a transistor in an anode initialization module. Therefore, the present disclosure implements more functions by using fewer transistors.

In an embodiment, the first power signal is multiplexed as the initialization voltage signal, or the second light emission control signal is multiplexed as the initialization voltage signal. With such arrangement, the initialization voltage signal does not need to be set additionally, which is beneficial to simplify the wiring of the display panel.

In an embodiment, the first light emission control module further includes a first transistor, a gate electrode of the first transistor is electrically connected with the first light emission control signal, a first electrode of the first transistor is electrically connected with the first power signal, and a second electrode of the first transistor is electrically connected to the first electrode of the drive transistor.

The second light emission control module further includes a second transistor, a gate electrode of the second transistor is electrically connected with the second light emission control signal, a first electrode of the second transistor is electrically connected to the second electrode of the drive transistor, and a second electrode of the second transistor is electrically connected to an anode of the light emission device.

The initialization control signal includes a first scanning signal and a second scanning signal; and the gate initialization module further includes a third transistor and a fourth transistor; a gate electrode of the third transistor is electrically connected with the second scanning signal, a first electrode of the third transistor is electrically connected with the initialization voltage signal, and a second electrode of the third transistor is electrically connected to the second electrode of the drive transistor; and a gate electrode of the fourth transistor is electrically connected with the first scanning signal, a first electrode of the fourth transistor is electrically connected to the second electrode of the drive transistor, and a second electrode of the fourth transistor is electrically connected to the gate electrode of the drive transistor.

The present disclosure implements more functions by using fewer transistors, where the fourth transistor is not only used as a transistor in the gate initialization module, but also may be multiplexed as a transistor in a data write module and may further be multiplexed as a transistor in the second gate initialization module.

In an embodiment, the pixel circuit further includes a fifth transistor.

A gate electrode of the fifth transistor is electrically connected with a third scanning signal, a first electrode of the fifth transistor is electrically connected with a data signal, and a second electrode of the fifth transistor is electrically connected to the first electrode of the drive transistor. The fourth transistor and the fifth transistor constitute a data write module, so that the fourth transistor is multiplexed as a transistor in the data write module, which is beneficial to reduce the number of transistors in the pixel circuit.

In an embodiment, the pixel circuit further includes a sixth transistor.

The gate electrode of the sixth transistor is electrically connected with a first scanning signal, a first electrode of the sixth transistor is electrically connected with a reference voltage signal, and a second electrode of the sixth transistor is electrically connected to the anode of the light emission device. The fourth transistor and the sixth transistor constitute the second gate initialization module, so that the fourth transistor is multiplexed as a transistor in the second gate initialization module and the sixth transistor is further multiplexed as the anode initialization module, which are beneficial to reduce the number of transistors in the pixel circuit.

The pixel circuit is a 7T1C circuit, where the fourth transistor is not only used as a transistor in a data write module, but also multiplexed as a transistor in the gate initialization module and further multiplexed as a transistor of the second gate initialization module. The sixth transistor is not only used as a transistor in the gate initialization module, but also multiplexed as a transistor in an anode initialization module. Therefore, the present disclosure implements more functions by using fewer transistors.

In an embodiment, the first light emission control module further includes a first transistor, a gate electrode of the first transistor is electrically connected with the first light emission control signal, a first electrode of the first transistor is electrically connected with the first power signal, and a second electrode of the first transistor is electrically connected to the first electrode of the drive transistor.

The second light emission control module further includes a second transistor, a gate electrode of the second transistor is electrically connected with the second light emission control signal, a first electrode of the second transistor is electrically connected to the second electrode of the drive transistor, and a second electrode of the second transistor is electrically connected to an anode of the light emission device.

The gate initialization module further includes a third transistor and a fourth transistor, a gate electrode of the third transistor is electrically connected with the initialization control signal, a first electrode of the third transistor is electrically connected to the second electrode of the drive transistor, and a second electrode of the third transistor is electrically connected to the gate electrode of the drive transistor; and a gate electrode of the fourth transistor is electrically connected with the initialization control signal, a first electrode of the fourth transistor is electrically connected with a reference voltage signal, and a second electrode of the fourth transistor is electrically connected to an anode of the light emission device.

In an embodiment, the pixel circuit further includes a fifth transistor, where a gate electrode of the fifth transistor is electrically connected with a first scanning signal, a first electrode of the fifth transistor is electrically connected with a data signal, and a second electrode of the fifth transistor is electrically connected to the first electrode of the drive transistor.

The pixel circuit is a 6T1C circuit, where the third transistor is not only used as a transistor in a data write module, but also multiplexed as a transistor in the gate initialization module. The fourth transistor is not only used as a transistor in the anode initialization module, but also multiplexed as a transistor in the gate initialization module. Therefore, the present disclosure implements more functions by using fewer transistors, the number of transistors used in the present disclosure is minimal, and the present disclosure is applicable to products with high pixel density (pixels per inch, PPI).

A display panel is further provided and includes the pixel circuit in any embodiments.

A method for driving a pixel circuit is provided and includes steps described below.

In an initialization stage, the second light emission control signal controls the second light emission control module to be off, the first light emission control signal controls the first light emission control module to be on, and the first power signal initializes the first electrode of the drive transistor; simultaneously, the initialization control signal controls the gate initialization module to be on, and the initialization voltage signal initializes the gate electrode of the drive transistor.

In a data write stage, the first light emission control signal controls the first light emission control module to be off, the second light emission control signal controls the second light emission control module to be off, and a data signal is written into the gate electrode of the drive transistor.

In a light emission stage, the first light emission control signal controls the first light emission control module to be on, the second light emission control signal controls the second light emission control module to be on, and the drive transistor generates a drive current to drive the light emission device to emit light.

The present disclosure provides a pixel circuit structure, where the first light emission control module and the second light emission control module in the pixel circuit are controlled by using different light emission control signals. With such arrangement, the first light emission control module and the second light emission control module can be on and off in different stages. The present disclosure ensures that the first light emission control module is on and the second light emission control module is off while the gate initialization module is on, so as to initialize the gate electrode and a source electrode of the drive transistor at the same time. That is, when the gate electrode of the drive transistor is electrically connected with a fixed potential, a fixed potential is also accessed to the source electrode of the drive transistor, and the gate electrode and the source electrode of the drive transistor in different working states in a previous frame are forced to reset at the same time, so that the drive transistor can be fully reset, and the working states of the drive transistor are consistent in the subsequent stages, thus improving the image-sticking phenomenon of the display panel.

DETAILED DESCRIPTION

The present disclosure is described below in conjunction with drawings and embodiments. The embodiments described herein are merely intended to explain and not to limit the present disclosure.

Figure 1:
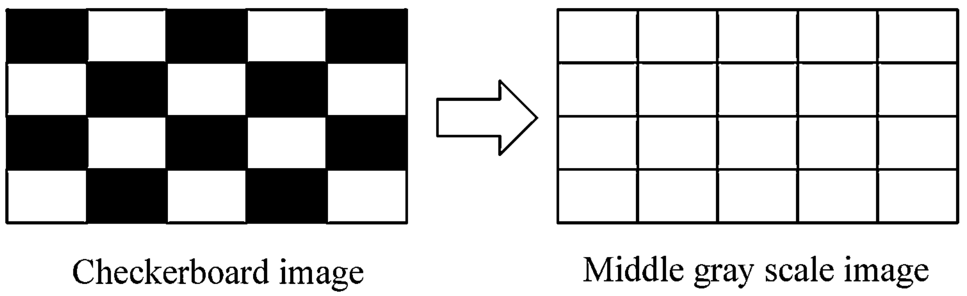
FIG. 1 is a schematic diagram of an image-sticking phenomenon of a display panel.

An image-sticking problem exists in a display panel. The image-sticking problem of the display panel is described below. FIG. 1 is a schematic diagram of an image-sticking phenomenon of a display panel. Referring to FIG. 1, when an image-sticking of the display panel is detected, the display panel is controlled to display a checkerboard image (e.g., black blocks of 0 gray scale alternate with white blocks of 255 gray scale) first, and then to display an image of a middle gray scale (e.g., 48 gray scale). As can be seen from FIG. 1, when the display panel is switched from the checkerboard image to the image of the middle gray scale, the brightness at the original black block position is higher than the brightness at the original white block position, that is, the residual image of the checkerboard (i.e., image-sticking) appears. This image-sticking may disappear after a period of time, so such image-sticking is also called short-term image-sticking. However, the short-term image-sticking phenomenon impacts the display effect of the display panel.

The reason for the problem is that the display panel usually includes a plurality of pixel circuits. Each pixel circuit includes a drive transistor for driving a light emission device to emit light, and the drive transistor controls the brightness of the light emission device through controlling a drive current passing through the light emission device. A magnitude of the drive current generated by the drive transistor is related to a gate-source voltage difference of the drive transistor. In different display gray scales, working states of the drive transistor are different, that is, the gate-source voltage differences are different, which leads to the difference in the capture and release of carriers in an interface, an active layer (such as p-Si) or a gate insulation layer. This difference will be carried from the previous frame to the next frame, so that the initial working state of the drive transistor varies. When a same gate voltage is written into a gate electrode of the drive transistor, different drive currents are generated, thus resulting in different brightness of the light emission device and generating the image-sticking.

Figure 2:
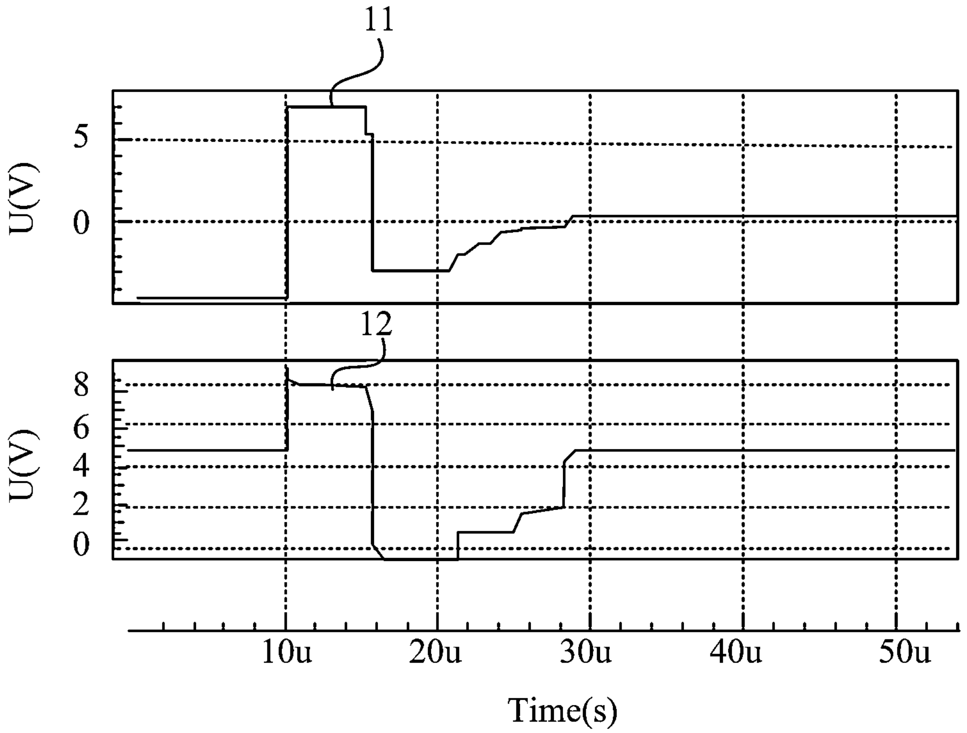
FIG. 2 is a graph showing the variation of a source voltage with a gate voltage in a drive transistor.

When the pixel circuit initializes the gate electrode of the drive transistor, a source electrode of the drive transistor is in a floating state. Since there is a parasitic capacitance in the drive transistor, when only the gate electrode of the drive transistor is reset, a source potential also jumps. As shown in FIG. 2, a curve 11 represents a gate voltage curve, and a curve 12 represents a source voltage curve. When the gate voltage is 7V, the source voltage is 8V. It can be seen that there is a problem that the reset of the drive transistor is not sufficient, resulting in the image-sticking of the display panel.

Figure 3:
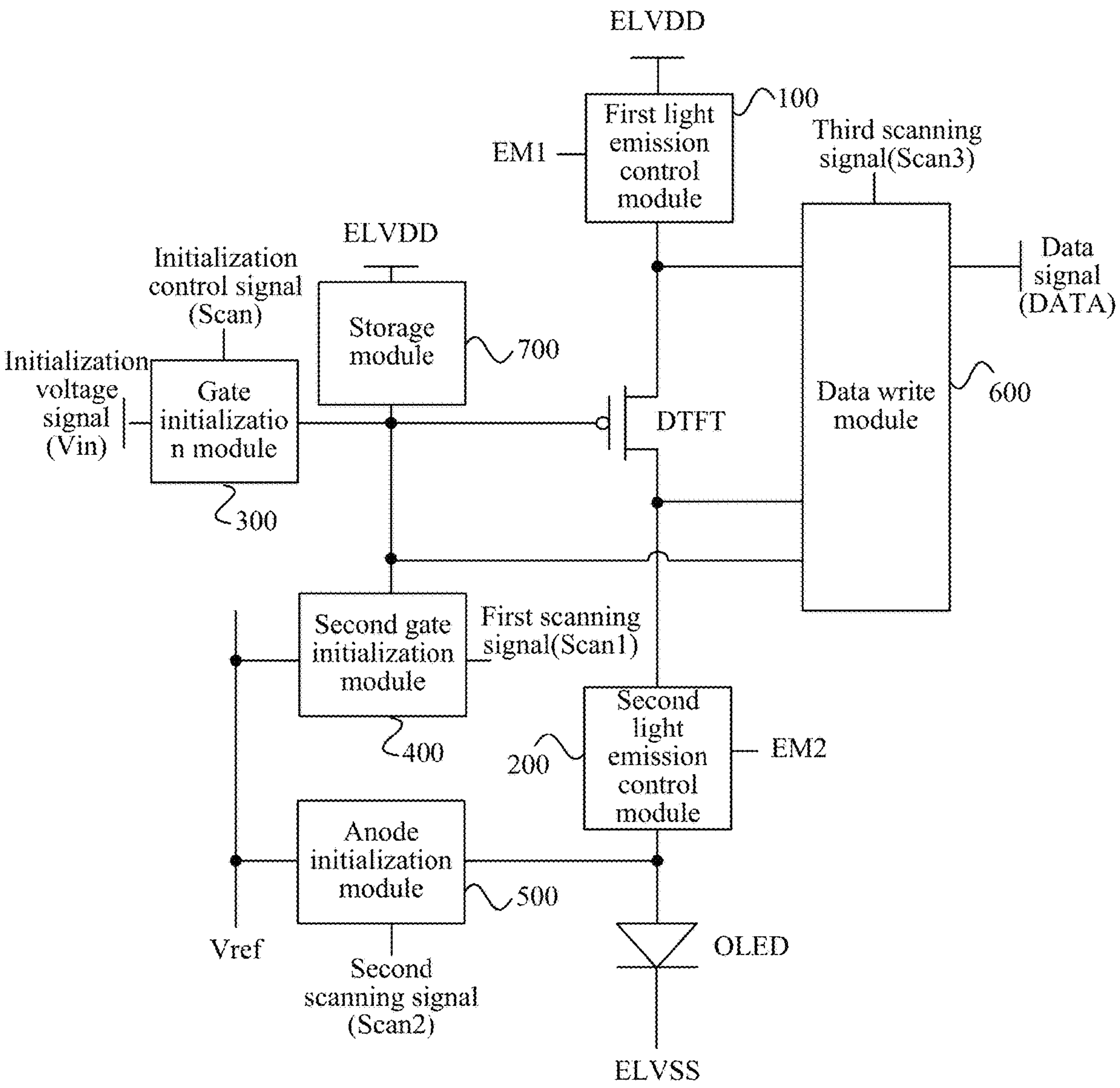
FIG. 3 is a circuit diagram of a pixel circuit according to one embodiment.

This embodiment provides a pixel circuit which can be applied to display panels such as an organic light emitting diode display panel, a micro light emitting diode display panel or a quantum dot light emitting diode display panel. FIG. 3 is a circuit diagram of a pixel circuit according to one embodiment. Referring to FIG. 3, the pixel circuit includes a drive transistor DTFT, a first light emission control module 100, a second light emission control module 200 and a gate initialization module 300.

The drive transistor DTFT includes a gate electrode, a first electrode and a second electrode. The drive transistor DTFT is configured to drive a light emission device OLED to emit light under the action of a first power signal ELVDD and a second power signal ELVSS. In the display panel, a transistor is a symmetrical structure, so that a first electrode of the transistor may be referred to as a source electrode or a drain electrode, and correspondingly, a second electrode of the transistor may be referred to as a drain electrode or a source electrode. In the following description, the first electrode of the drive transistor DTFT is called a source electrode, and the second electrode of the drive transistor DTFT is called a drain electrode.

The first light emission control module 100 includes a control terminal, a first terminal and a second terminal. The control terminal of the first light emission control module 100 is electrically connected with a first light emission control signal EM1, the first terminal of the first light emission control module 100 is electrically connected with a first power signal ELVDD, and the second terminal of the first light emission control module 100 is electrically connected to the first electrode of the drive transistor DTFT. The first light emission control module 100 is configured to be on in an initialization stage, and the source electrode of the drive transistor DTFT is initialized by using the first power signal ELVDD; and the first light emission control module 100 is configured to be on in a light emission stage, so that the drive transistor DTFT generates a drive current.

The second light emission control module 200 includes a control terminal, a first terminal and a second terminal. The control terminal of the second light emission control module 200 is electrically connected with a second light emission control signal EM2, the first terminal of the second light emission control module 200 is electrically connected to a drain electrode of the drive transistor DTFT, and the second terminal of the second light emission control module 200 is electrically connected to the light emission device OLED. The second light emission control module 200 is configured to be on in a light emission stage so as to transmit the drive current generated by the drive transistor DTFT to the light emission device OLED.

The gate initialization module 300 includes a control terminal, a first terminal and a second terminal. The control terminal of the gate initialization module 300 is electrically connected with an initialization control signal Scan, the first terminal of the gate initialization module 300 is electrically connected with an initialization voltage signal Vin, and the second terminal of the gate initialization module 300 is electrically connected to the gate electrode of the drive transistor DTFT. The gate initialization module 300 is configured to be on together with the first light emission control module 100 in an initialization stage, so as to initialize the gate electrode and a source electrode of the drive transistor DTFT at the same time.

In the pixel circuit structure provided in this embodiment, the first light emission control module 100 and the second light emission control module 200 are controlled by using different light emission control signals. Thus, the first light emission control module 100 and the second light emission control module 200 may be on and off at different stages. This embodiment ensures that the first light emission control module 100 is on and the second light emission control module 200 is off while the gate initialization module 300 is on, so as to initialize the gate electrode and the source electrode of the drive transistor DTFT at the same time. That is, when the gate electrode of the drive transistor DTFT is electrically connected with a fixed potential, a fixed potential is also accessed to the source electrode of the drive transistor DTFT, so that the gate electrode and the source electrode of the drive transistor DTFT in different working states in a previous frame are forced to reset. In this manner, the drive transistor DTFT can be fully reset, and the working states of the drive transistor DTFT are consistent in the subsequent stages, thus improving the image-sticking phenomenon of the display panel.

Referring to FIG. 3, the pixel circuit further includes a second gate initialization module 400, an anode initialization module 500, a data write module 600 and a storage module 700.

The second gate initialization module 400 includes a control terminal, a first terminal and a second terminal. The control terminal of the second gate initialization module 400 is electrically connected with a first scanning signal Scan1, the first terminal of the second gate initialization module 400 is electrically connected with a reference voltage signal Vref, and the second terminal of the second gate initialization module 400 is electrically connected to the gate electrode of the drive transistor DTFT. The second gate initialization module 400 is configured to be on in a second stage of the initialization stage to initialize the gate electrode of the drive transistor DTFT and ensure that the drive transistor DTFT is in an on state in a data write stage.

The anode initialization module 500 includes a control terminal, a first terminal and a second terminal. The control terminal of the anode initialization module 500 is electrically connected with a second scanning signal Scan2, the first terminal of the anode initialization module 500 is electrically connected with the reference voltage signal Vref, and the second terminal of the anode initialization module 500 is electrically connected to an anode of the light emission device OLED. The anode initialization module 500 is configured to be on in the second stage of the initialization stage, so as to initialize the anode of the light emission device OLED.

The data write module 600 includes a control terminal, a first terminal, a second terminal and a third terminal. The control terminal of the data write module 600 is electrically connected with a third scanning signal Scan3, the first terminal of the data write module 600 is electrically connected with a data signal DATA, the second terminal of the data write module 600 is electrically connected to a drain electrode of the drive transistor DTFT, and the third terminal of the data write module 600 is electrically connected to the gate electrode of the drive transistor DTFT. The data write module 600 is configured to be on in a data write stage, so as to write the data signal DATA into the gate electrode of the drive transistor DTFT.

The storage module 700 includes a first terminal and a second terminal. The first terminal of the storage module 700 is electrically connected with a first power signal ELVDD, and the second terminal of the storage module 700 is electrically connected to the gate electrode of the drive transistor DTFT. The storage module is configured to store a potential of the drive transistor DTFT, so as to ensure that a gate potential of the drive transistor DTFT is stable in the light emission stage, and the drive transistor DTFT generates a stable drive current.

Figure 4:
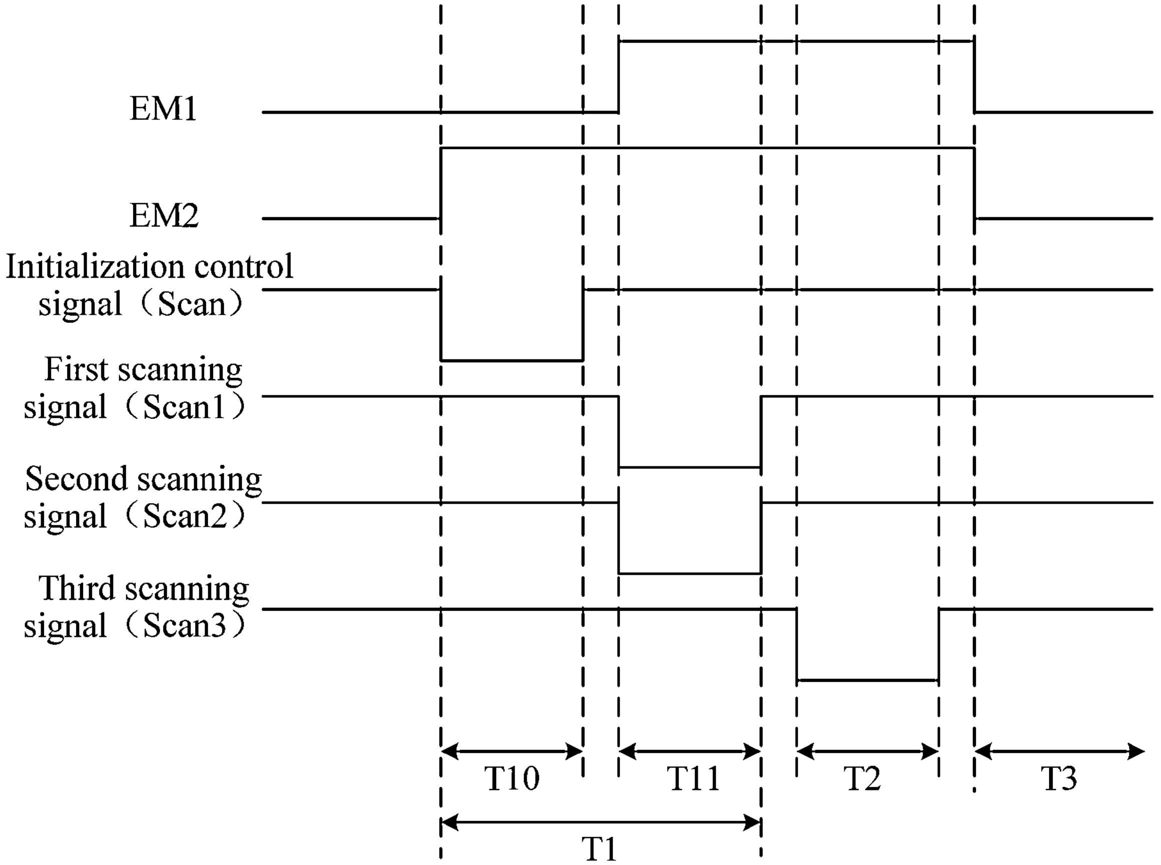
FIG. 4 is a driving timing diagram of the pixel circuit according to one embodiment.

FIG. 4 is a driving timing diagram of a pixel circuit according to one embodiment. The pixel circuit mainly composed of P-type transistors is taken as an example in conjunction with FIGS. 3 to 4. A driving process of the pixel circuit is as follows.

An initialization stage T1 includes a first stage T10 and a second stage T11. In the first stage T10, the second light emission control signal EM2, the first scanning signal Scan1, the second scanning signal Scan2 and the third scanning signal Scan3 are at a high level, and the first light emission control signal EM1 and the initialization control signal Scan are at a low level. The second light emission control signal EM2 controls the second light emission control module 200 to be off, the first scanning signal Scan1 controls the second gate initialization module 400 to be off, the second scanning signal Scan2 controls the anode initialization module 500 to be off, and the third scanning signal Scan3 controls the data write module 600 to be off. The first light emission control signal EM1 controls the first light emission control module 100 to be on, and at the same time, the initialization control signal Scan controls the gate initialization module 300 to be on. Thus, the first power signal ELVDD initializes the source electrode of the drive transistor DTFT through the first light emission control module 100. Meanwhile, the initialization voltage signal Vin initializes the gate electrode of the drive transistor DTFT through the gate initialization module 300. In the first stage T10, the gate electrode and the source electrode of the drive transistor DTFT in different working states in the previous frame are forcibly reset, so that the drive transistor DTFT can be fully reset.

In the second stage T11, the first light emission control signal EM1, the second light emission control signal EM2, the initialization control signal Scan and the third scanning signal Scan3 are at a high level, and the first scanning signal Scan1 and the second scanning signal Scan2 are at a low level. The first light emission control signal EM1 controls the first light emission control module 100 to be off, the second light emission control signal EM2 controls the second light emission control module 200 to be off, the initialization control signal Scan controls the gate initialization module 300 to be off, and the third scanning signal Scan3 controls the data write module 600 to be off. The first scanning signal Scan1 controls the second gate initialization module 400 to be on, and the reference voltage signal Vref initializes the gate electrode of the drive transistor DTFT to ensure that the drive transistor DTFT is in an on state in the data write stage T2. The second scanning signal Scan2 controls the anode initialization module 500 to be on, and the reference voltage signal Vref initializes the anode of the light emission device OLED.

In the data write stage T2, the first light emission control signal EM1, the second light emission control signal EM2, the initialization control signal Scan, the first scanning signal Scan1 and the second scanning signal Scan2 are at a high level, and the third scanning signal Scan3 is at a low level. The first light emission control signal EM1 controls the first light emission control module 100 to be off, the second light emission control signal EM2 controls the second light emission control module 200 to be off, the initialization control signal Scan controls the gate initialization module 300 to be off, the first scanning signal Scan1 controls the second gate initialization module 400 to be off, and the second scanning signal Scan2 controls the anode initialization module 500 to be off. The third scanning signal Scan3 controls the data write module 600 to be on, so as to write the data signal DATA into the gate electrode of the drive transistor DTFT.

In the light emission stage T3, the initialization control signal Scan, the first scanning signal Scan1, the second scanning signal Scan2 and the third scanning signal Scan3 are at a high level, and the first light emission control signal EM1 and the second light emission control signal EM2 are at a low level. The initialization control signal Scan controls the gate initialization module 300 to be off, the first scanning signal Scan1 controls the second gate initialization module 400 to be off, the second scanning signal Scan2 controls the anode initialization module 500 to be off, and the third scanning signal Scan3 controls the data write module 600 to be off. The first light emission control signal EM1 controls the first light emission control module 100 to be on, the second light emission control signal EM2 controls the second light emission control module 200 to be on, and the drive transistor DTFT generates a drive current to flow into the anode of the light emission device OLED, so as to drive the light emission device to emit light.

In one embodiment, the first scanning signal Scan1 may be multiplexed as the initialization control signal Scan, or the second scanning signal Scan2 may be multiplexed as the initialization control signal Scan. With such arrangement, the number of control signal lines can be reduced, which is beneficial to simplify the wiring of the display panel. At the same time, reducing the number of control signal lines can also simplify the design of a scanning drive circuit, which is beneficial to the narrow frame design of the display panel.

In one embodiment, the first power signal ELVDD may be multiplexed as the initialization voltage signal Vin. With such arrangement, the initialization voltage signal Vin does not need to be set additionally, which is beneficial to simplify the wiring of the display panel. In the first stage T10 of the initialization stage T1, the first power signal ELVDD is written into the gate electrode and the source electrode of the drive transistor DTFT separately, so that the drive transistor DTFT is in an off-state bias state. In the off-state bias state, the drive transistor DTFT does not generate a bias current, which is beneficial to prolong the service life of the drive transistor DTFT.

In one embodiment, the second light emission control signal EM2 may be multiplexed as the initialization voltage signal Vin. With such arrangement, the initialization voltage signal Vin does not need to be set additionally, which is beneficial to simplify the wiring of the display panel.

Exemplarily, the pixel circuit is mainly composed of P-type transistors. In the first stage T10 of the initialization stage T1, the first light emission control signal EM1 is at a low level, the second light emission control signal EM2 is at a high level, the first power signal ELVDD is at a high level, the gate electrode of the drive transistor DTFT is written with a high level, and the source electrode of the drive transistor DTFT is written with a high level, so that the drive transistor DTFT is in the off-state bias state. In the off-state bias state, the drive transistor DTFT does not generate a bias current, which is beneficial to prolong the service life of the drive transistor DTFT.

Exemplarily, the pixel circuit is mainly composed of N-type transistors. In the first stage T10 of the initialization stage T1, the first light emission control signal EM1 is at a high level, the second light emission control signal EM2 is at a low level, the first power signal ELVDD is at a high level, the gate electrode of the drive transistor DTFT is written with a low level, and the source electrode of the drive transistor DTFT is written with a high level, so that the drive transistor DTFT is in an on-state bias state.

In one embodiment, the reference voltage signal Vref may be multiplexed as the initialization voltage signal Vin. With such arrangement, the initialization voltage signal Vin does not need to be set additionally, which is beneficial to simplify the wiring of the display panel. Since the first light emission control signal EM1 is mostly at a high level and the reference voltage signal Vref is mostly at a low level, in the first stage T10 of the initialization stage T1, the gate electrode of the drive transistor DTFT is written with a low level, and the source electrode of the drive transistor DTFT is written with a high level, so that the drive transistor DTFT is in the on-state bias state.

In the above embodiments, in the process of initializing the gate electrode and the source electrode of the drive transistor DTFT at the same time, whether the drive transistor DTFT is in the on-state bias state or the off-state bias state, the gate electrode and the source electrode of the drive transistor DTFT in different working states in the previous frame can be forcibly reset, so that the drive transistor DTFT can be fully reset, the working states of the drive transistor DTFT are consistent in the subsequent stages, and the image-sticking phenomenon of the display panel is improved.

In the above embodiments, how to select the first scanning signal Scan1 or the second scanning signal Scan2 to be multiplexed as the initialization control signal Scan and how to select the first power signal ELVDD, the second light emission control signal EM2 or the reference voltage signal Vref to be multiplexed as the initialization voltage signal Vin need to be set according to the circuit structure. Several structures of the pixel circuit are described below.

Figure 5:
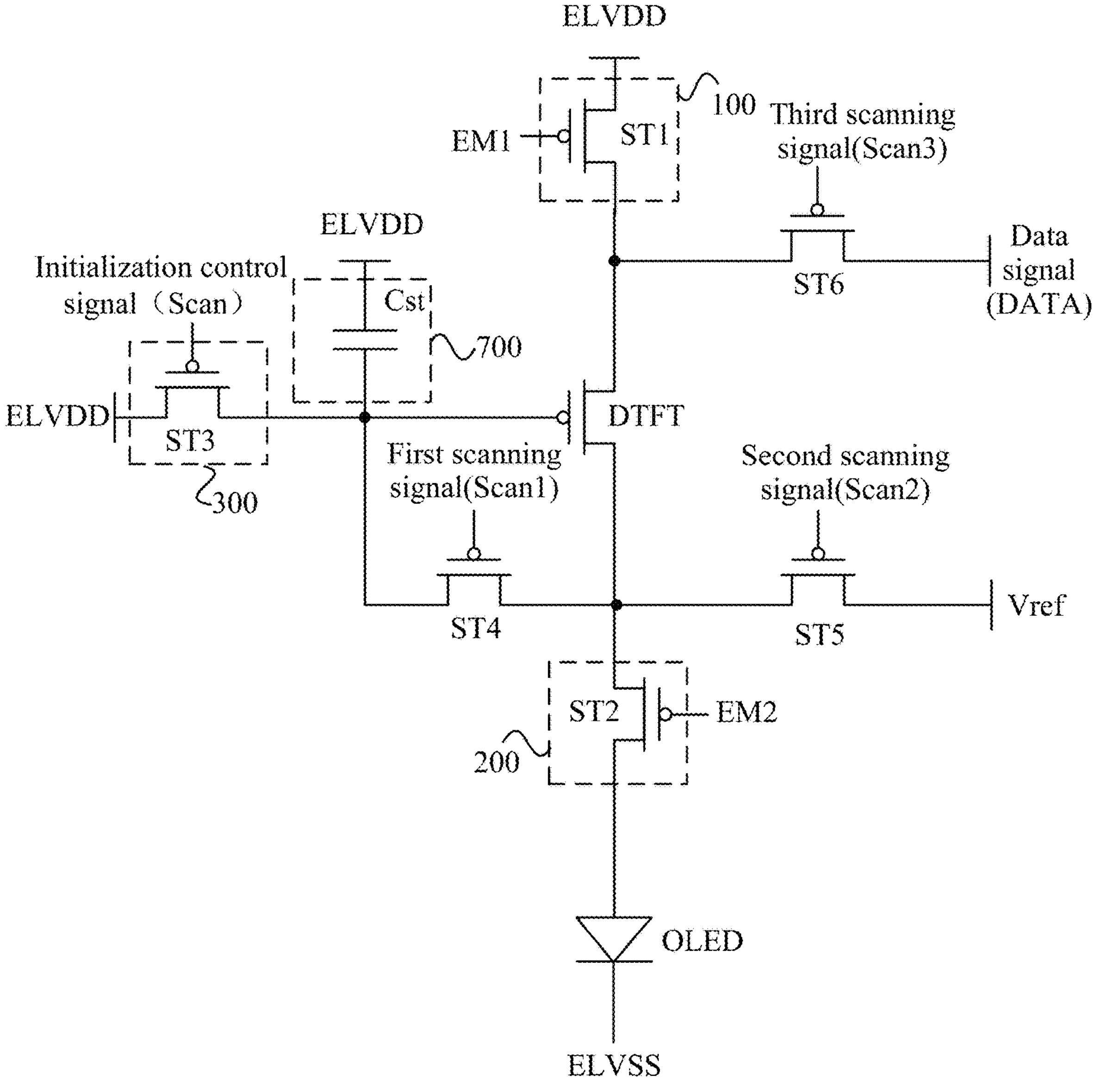
FIG. 5 is a circuit diagram of another pixel circuit according to one embodiment.

FIG. 5 is a circuit diagram of another pixel circuit according to one embodiment. Referring to FIG. 5, in one embodiment, the first light emission control module 100 may include a first transistor ST1, a gate electrode of the first transistor ST1 is electrically connected with the first light emission control signal EM1, a first electrode of the first transistor ST1 is electrically connected with the first power signal ELVDD, and a second electrode of the first transistor ST1 is electrically connected to the source electrode of the drive transistor DTFT.

The second light emission control module 200 includes a second transistor ST2, a gate electrode of the second transistor ST2 is electrically connected with the second light emission control signal EM2, a first electrode of the second transistor ST2 is electrically connected to the second electrode of the drive transistor DTFT, and a second electrode of the second transistor ST2 is electrically connected to an anode of the light emission device OLED.

The gate initialization module 300 includes a third transistor ST3, a gate electrode of the third transistor ST3 is electrically connected with the initialization control signal Scan, (FIG. 5 exemplarily illustrates the case where the first power signal ELVDD is multiplexed as the initialization voltage signal) a first electrode of the third transistor ST3 is electrically connected with the initialization voltage signal, and a second electrode of the third transistor ST3 is electrically connected to the gate electrode the drive transistor DTFT.

In this embodiment, the first light emission control module 100, the second light emission control module 200 and the gate initialization module 300 are configured to each include one transistor, which is beneficial to reduce the number of transistors in the pixel circuit, thereby simplifying the structure of the pixel circuit.

Referring to FIG. 5, in one embodiment, the storage module 700 may include a capacitance Cst.

Referring to FIG. 5, in one embodiment, the pixel circuit may further includes a fourth transistor ST4, a fifth transistor ST5 and a sixth transistor ST6.

A gate electrode of the fourth transistor ST4 is electrically connected with the first scanning signal Scan1, a first electrode of the fourth transistor ST4 is electrically connected to the drain electrode of the drive transistor DTFT, and a second electrode of the fourth transistor ST4 is electrically connected to the gate electrode of the drive transistor DTFT.

A gate electrode of the fifth transistor ST5 is electrically connected with the second scanning signal Scan2, a first electrode of the fifth transistor ST5 is electrically connected with the reference voltage signal Vref, and a second electrode of the fifth transistor ST5 is electrically connected to the second electrode of the drive transistor DTFT.

A gate electrode of the sixth transistor ST6 is electrically connected with the third scanning signal Scan3, a first electrode of the sixth transistor ST6 is electrically connected with the data signal DATA, and a second electrode of the sixth transistor ST6 is electrically connected to the source electrode of the drive transistor DTFT.

The pixel circuit is a 7T1C circuit, where the fourth transistor ST4 is not only used as a transistor in the data write module 600, but also multiplexed as a transistor in the second gate initialization module 400. The fifth transistor ST5 is not only used as a transistor in the second gate initialization module 400, but also multiplexed as a transistor in the anode initialization module 500. Therefore, this embodiment implements more functions by using fewer transistors.

Figure 6:
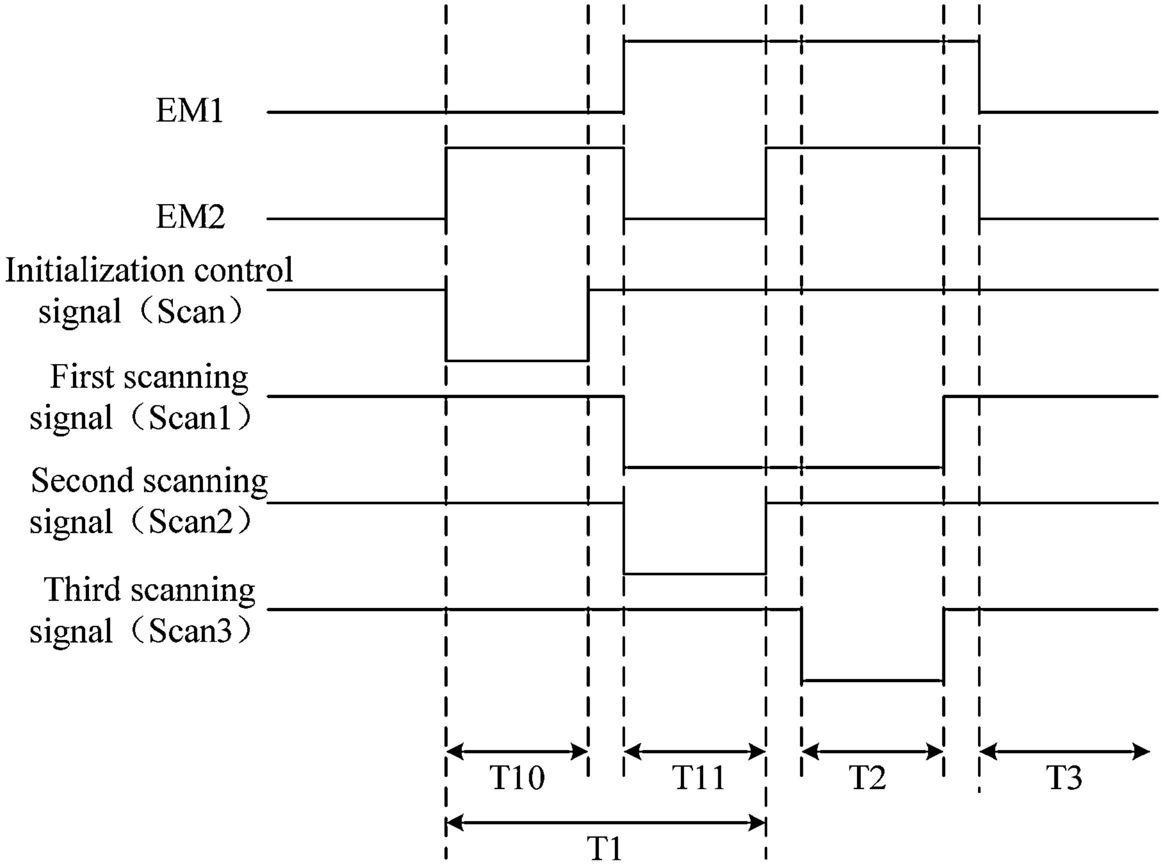
FIG. 6 is a driving timing diagram of the pixel circuit in FIG. 5.

FIG. 6 is a driving timing diagram of the pixel circuit in FIG. 5. Referring to FIGS. 5 to 6, the driving process of the pixel circuit is as follows.

An initialization stage T1 includes a first stage T10 and a second stage T11. In the first stage T10, the second light emission signal EM2, the first scanning signal Scan1, the second scanning signal Scan2 and the third scanning signal Scan3 are at a high level, and the first light emission control signal EM1 and the initialization control signal Scan are at a low level. The second transistor ST2, the fourth transistor ST4, the fifth transistor ST5 and the sixth transistor ST6 are off, the first transistor ST1 and the third transistor ST3 are on, and the first power signal ELVDD initializes the source electrode and the gate electrode of the drive transistor DTFT at the same time.

In the second stage T11, the first light emission control signal EM1, the initialization control signal Scan and the third scanning signal Scan3 are at a high level, and the second light emission control signal EM2, the first scanning signal Scan1 and the second scanning signal Scan2 are at a low level. The first transistor ST1, the third transistor ST3 and the sixth transistor ST6 are off, the second transistor ST2, the fourth transistor ST4 and the fifth transistor ST5 are on, and the reference voltage signal Vref is written into the gate electrode of the drive transistor DTFT through the fourth transistor ST4 and the fifth transistor ST5 to ensure that the drive transistor DTFT is in the on state in a data write stage T2. The reference voltage signal Vref is written into the anode of the light emission device OLED through the fifth transistor ST5 and the second transistor ST2, and the reference voltage signal Vref initializes the anode of the light emission device OLED.

In the data write stage T2, the first light emission control signal EM1, the second light emission control signal EM2, the initialization control signal Scan and the second scanning signal Scan2 are at a high level, and the first scanning signal Scan1 and the third scanning signal Scan3 are at a low level. The first transistor ST1, the second transistor ST2, the third transistor ST3 and the fifth transistor T5 are off. The fourth transistor ST4 and the sixth transistor ST6 are on so as to write the data signal DATA into the gate electrode of the drive transistor DTFT.

In a light emission stage T3, the initialization control signal Scan, the first scanning signal Scan1, the second scanning signal Scan2 and the third scanning signal Scan3 are at a high level, and the first light emission control signal EM1 and the second light emission control signal EM2 are at a low level. The third transistor ST3, the fourth transistor ST4, the fifth transistor ST5 and the sixth transistor ST6 are off. The first transistor ST1 and the second transistor ST2 are on, and the drive transistor DTFT generates a drive current to flow into the anode of the light emission device OLED to drive the light emission device OLED to emit light.

Figure 7:
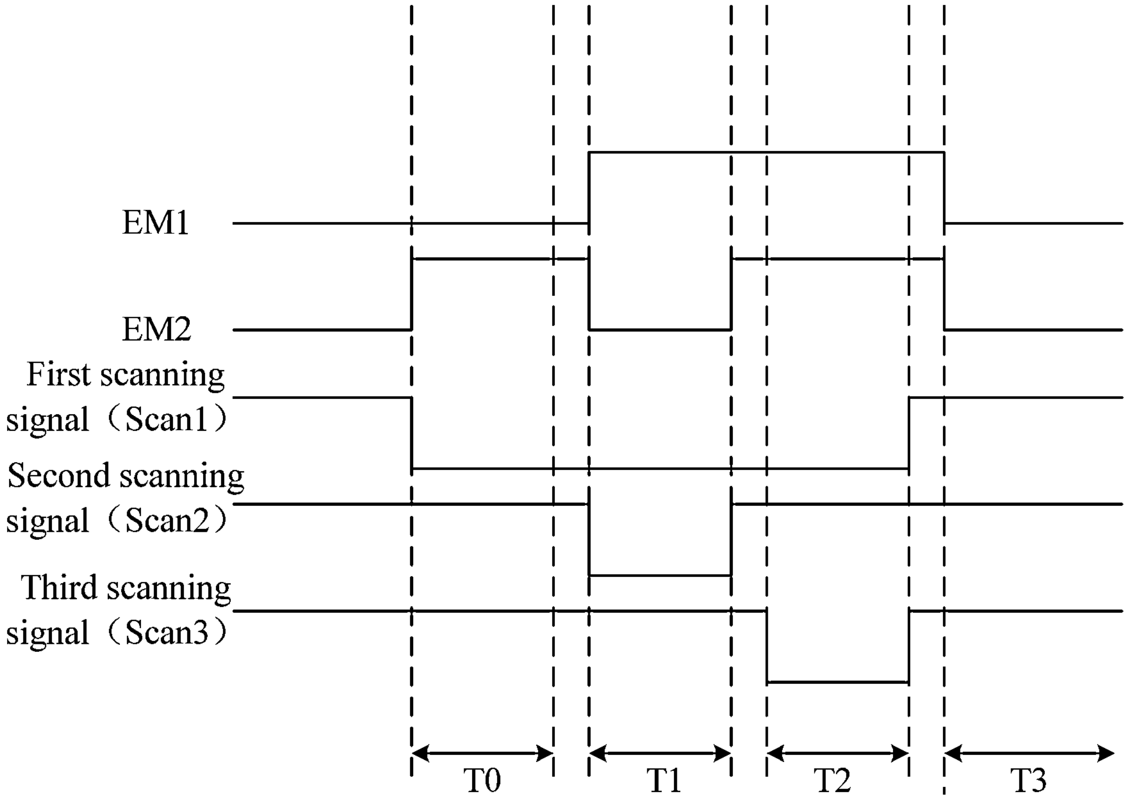
FIG. 7 is another driving timing diagram of the pixel circuit in FIG. 5.
Figure 8:
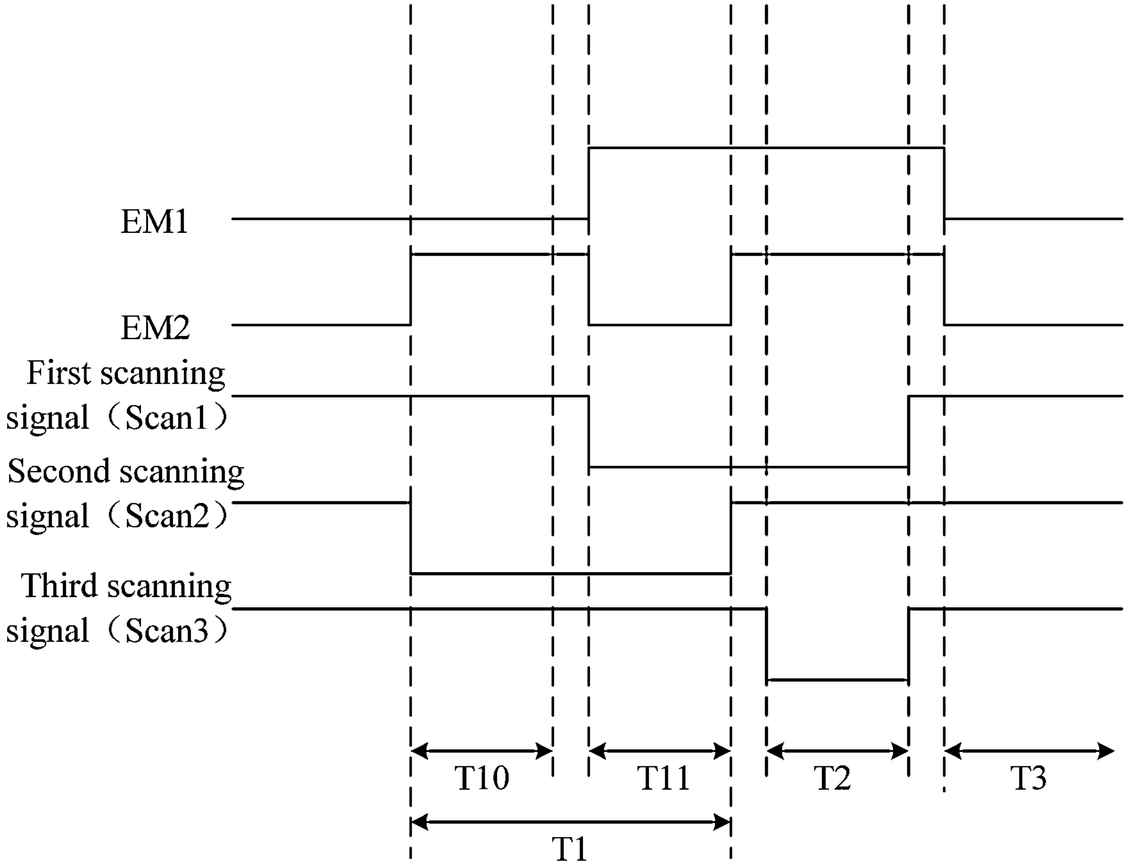
FIG. 8 is another driving timing diagram of the pixel circuit in FIG. 5.

Referring to FIG. 5, in one embodiment, the first scanning signal Scan1 or the second scanning signal Scan2 may be multiplexed as the initialization control signal Scan, and thus, the driving timing diagram of the pixel circuit is shown in FIG. 7 or FIG. 8, and the driving process of the pixel circuit is similar to the driving process of the foregoing embodiment, which will not be described herein.

The pixel circuit shown in FIG. 5 exemplarily shows that the first power signal ELVDD is multiplexed as the initialization voltage signal and not to limit the present disclosure. In other embodiments, the second light emission control signal EM2 used by the pixel circuit shown in FIG. 5 may also be set to be multiplexed as the initialization voltage signal.

Figure 9:
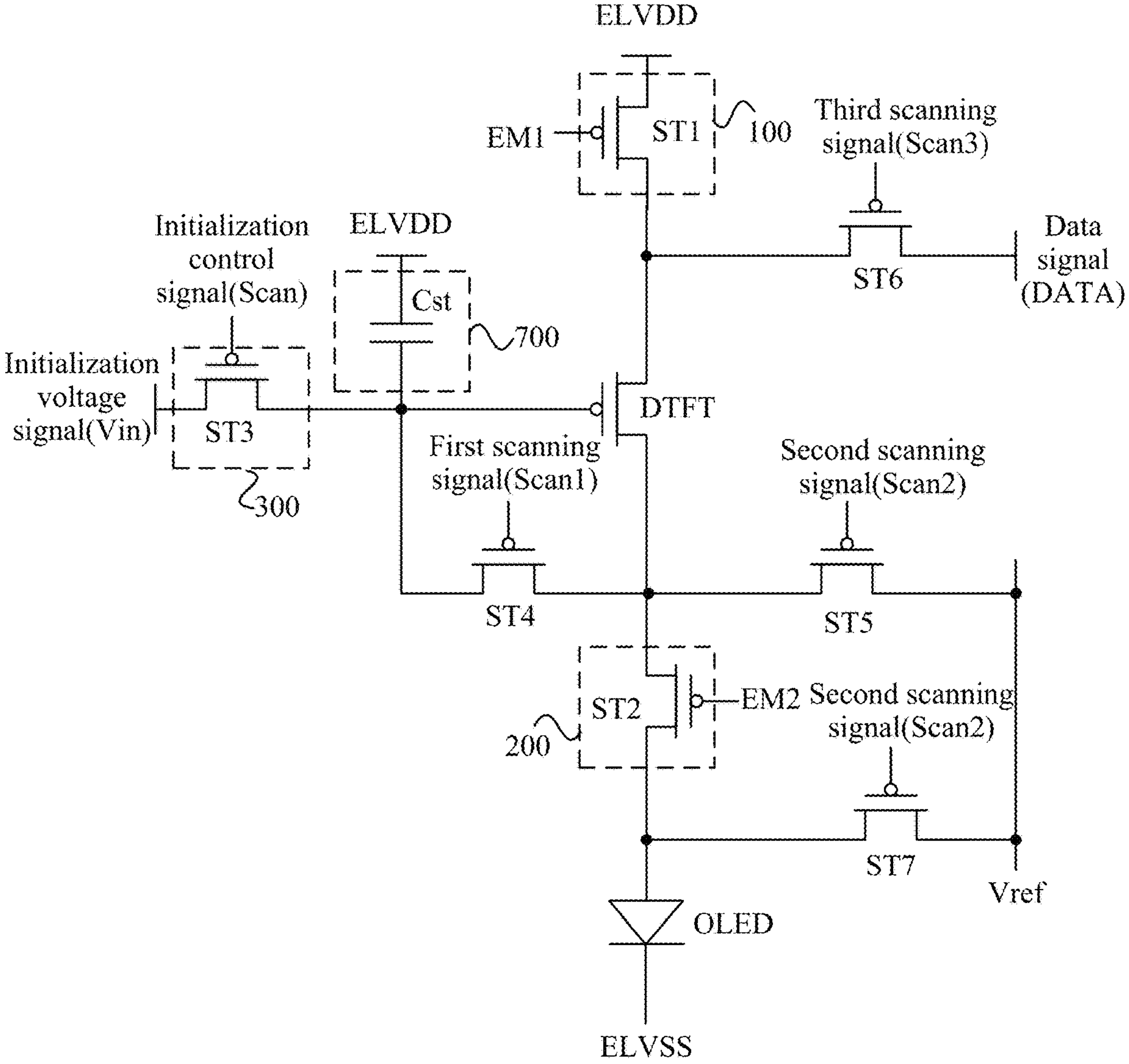
FIG. 9 is a circuit diagram of another pixel circuit according to one embodiment.

FIG. 9 is a circuit diagram of another pixel circuit according to one embodiment. Referring to FIG. 9, on the basic of the pixel circuit shown in FIG. 5, the pixel circuit may further include a seventh transistor ST7, where a gate electrode of the seventh transistor ST7 is electrically connected with the second scanning signal Scan2, a first electrode of the seventh transistor ST7 is electrically connected with the reference voltage signal Vref, and a second electrode of the seventh transistor ST7 is electrically connected to the anode of the light emission device OLED.

The pixel circuit is a 8T1C circuit, where the fourth transistor ST4 is not only used as a transistor in the data write module 600, but also multiplexed as a transistor in the second gate initialization module 400. Therefore, this embodiment implements more functions by using fewer transistors.

Figure 10:
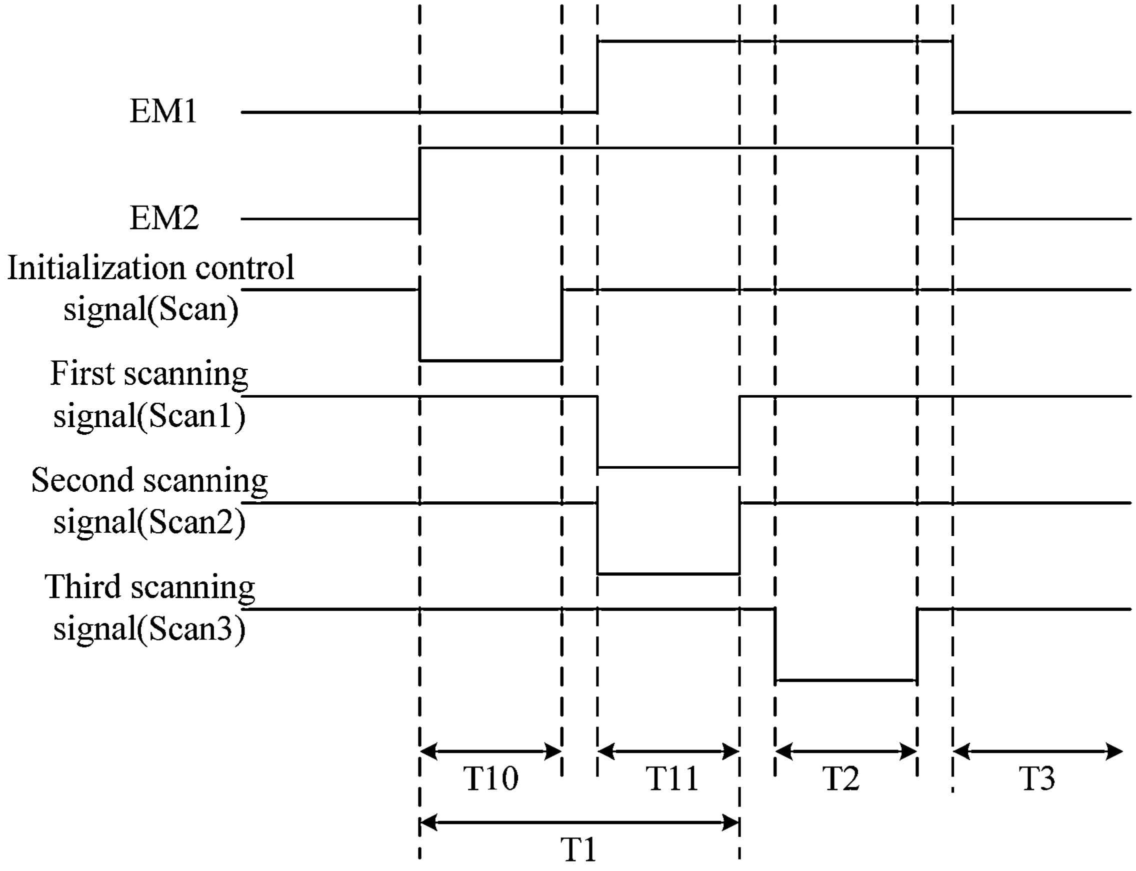
FIG. 10 is a driving timing diagram of the pixel circuit in FIG. 9.

FIG. 10 is a driving timing diagram of the pixel circuit in FIG. 9. In conjunction with FIGS. 9 to 10, in the pixel circuit in FIG. 9 which is different from the pixel circuit in FIG. 5, in the second stage T11 of the initialization stage T1, the second light emission control signal EM2 is at a high level, and the second transistor ST2 is off; and the reference voltage signal Vref is written into the anode of the light emission device OLED through the seventh transistor ST7, and the reference voltage signal Vref initializes the anode of the light emission device OLED.

In one embodiment, in a structure of the pixel circuit shown in FIG. 9, the first scanning signal Scan1 or the second scanning signal Scan2 may be multiplexed as the initialization control signal Scan.

In one embodiment, in a structure of the pixel circuit shown in FIG. 9, the first power signal ELVDD or the second light emission control signal EM2 may be multiplexed as the initialization voltage signal Vin.

The reference voltage signal Vref is exemplarily shown in FIGS. 5 and 9 for initializing not only the gate electrode of the drive transistor DTFT but also the anode of the light emission device OLED and is not to limit the present disclosure. In other embodiments, different reference voltage signals may also be used for initializing the gate electrode of the drive transistor DTFT and the anode of the light emission device OLED.

Figure 11:
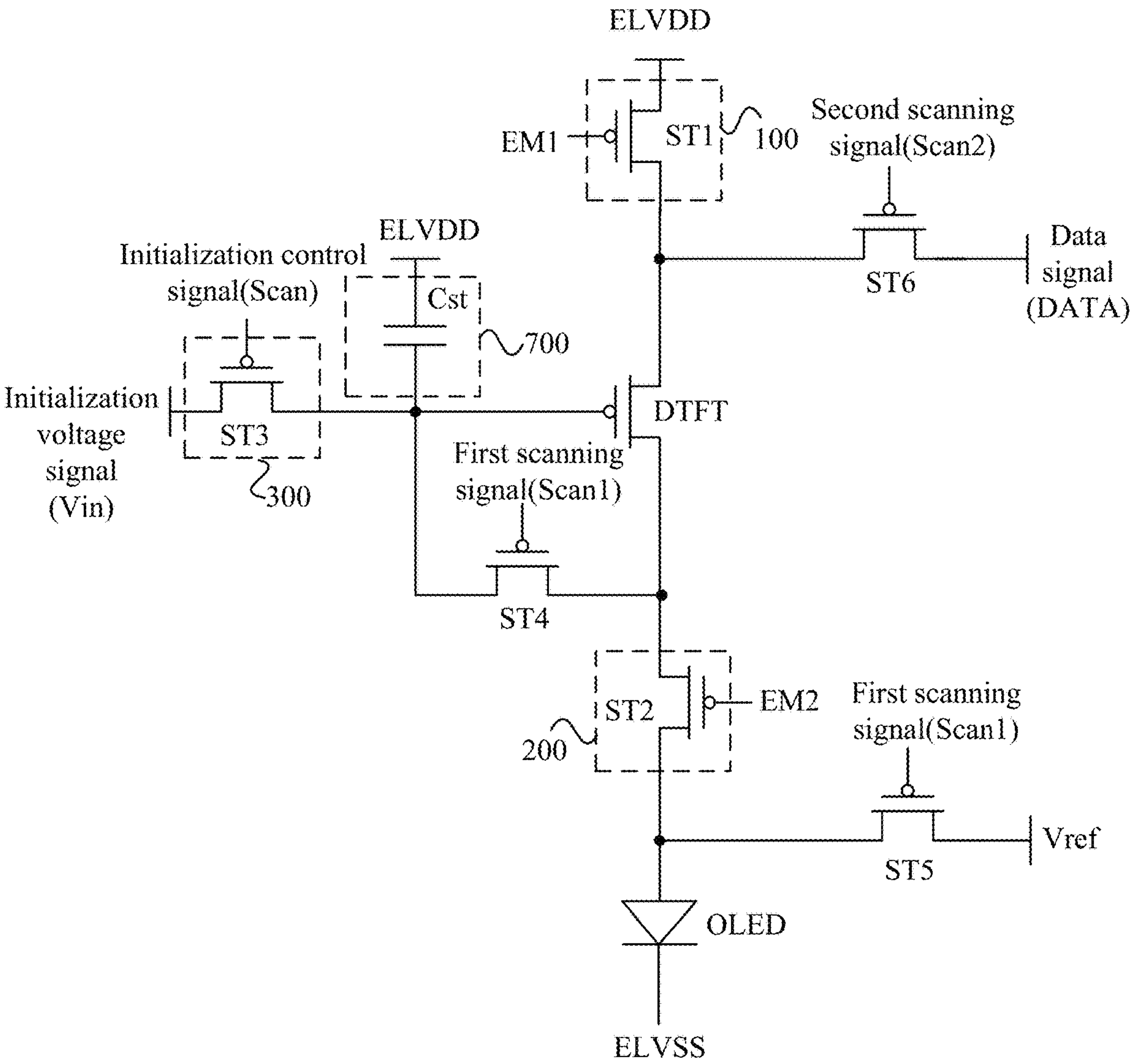
FIG. 11 is a circuit diagram of another pixel circuit according to one embodiment.

FIG. 11 is a circuit diagram of another pixel circuit according to one embodiment. Referring to FIG. 11, in one embodiment, the pixel circuit may include a first transistor ST1, a second transistor ST2, a third transistor ST3, a fourth transistor ST4, a fifth transistor ST5 and a sixth transistor ST6.

A gate electrode of the fourth transistor ST4 is electrically connected with the first scanning signal Scan1, a first electrode of the fourth transistor ST4 is electrically connected to the second electrode of the drive transistor DTFT, and a second electrode of the fourth transistor ST4 is electrically connected to the gate electrode of the drive transistor DTFT.

A gate electrode of the fifth transistor ST5 is electrically connected with the first scanning signal Scan1, a first electrode of the fifth transistor ST5 is electrically connected with the reference voltage signal Vref, and a second electrode of the fifth transistor ST5 is electrically connected to a second electrode of the second transistor ST2.

A gate electrode of the sixth transistor ST6 is electrically connected with the second scanning signal Scan2, a first electrode of the sixth transistor ST6 is electrically connected with the data signal DATA, and a second electrode of the sixth transistor ST6 is electrically connected to the first electrode of the drive transistor DTFT.

The pixel circuit is a 7T1C circuit, where the fourth transistor ST4 is not only used as a transistor in the data write module 600, but also multiplexed as a transistor in the second gate initialization module 400. The fifth transistor ST5 is not only used as a transistor in the second gate initialization module 400, but also multiplexed as a transistor in the anode initialization module 500. Therefore, this embodiment implements more functions by using fewer transistors.

Figure 12:
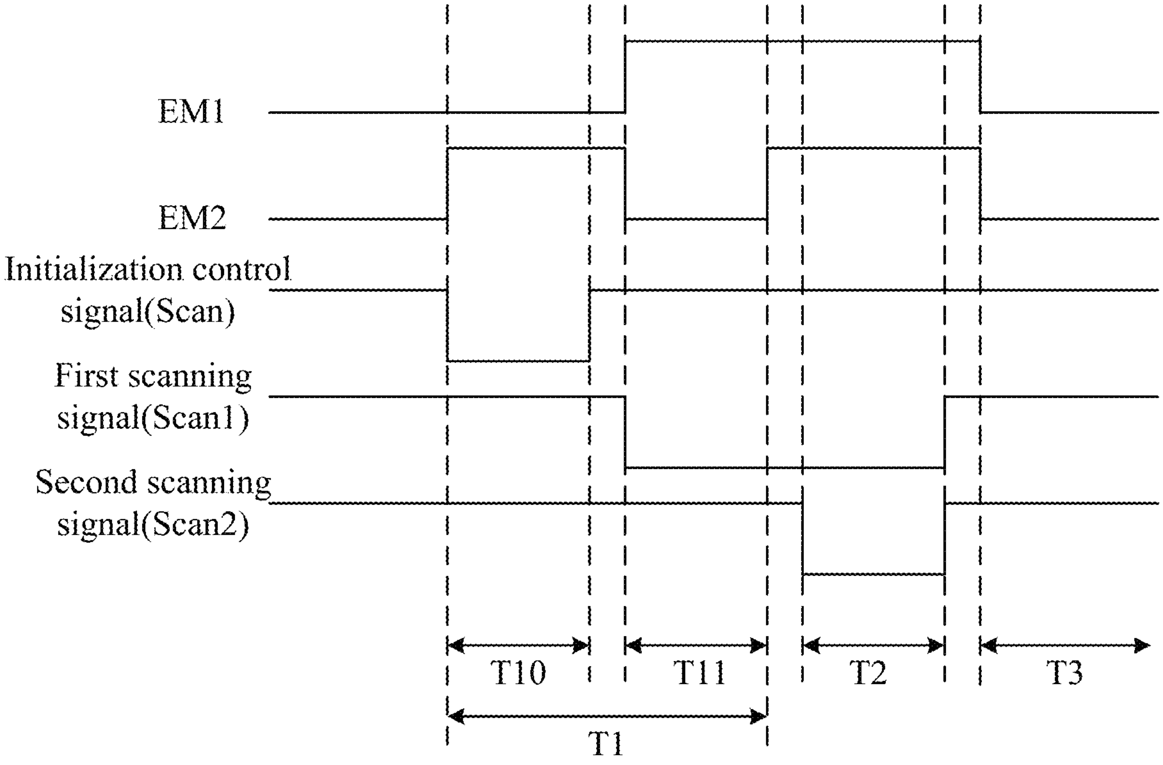
FIG. 12 is a driving timing diagram of the pixel circuit in FIG. 11.

FIG. 12 is a driving timing diagram of the pixel circuit in FIG. 11. Referring to FIGS. 11 to 12, the driving process of the pixel circuit is as follows.

An initialization stage T1 includes a first stage T10 and a second stage T11. In the first stage T10, the second light emission signal EM2, the first scanning signal Scan1 and the second scanning signal Scan2 are at a high level, and the first light emission control signal EM1 and the initialization control signal Scan are at a low level. The second transistor ST2, the fourth transistor ST4, the fifth transistor ST5 and the sixth transistor ST6 are off, the first transistor ST1 and the third transistor ST3 are on, the first power signal ELVDD initializes the source electrode of the drive transistor DTFT, and the initialization voltage signal Vin initializes the gate electrode of the drive transistor DTFT.

In the second stage T11, the first light emission control signal EM1, the initialization control signal Scan and the second scanning signal Scan2 are at a high level, and the second light emission control signal EM2 and the first scanning signal Scan1 are at a low level. The first transistor ST1, the third transistor ST3 and the sixth transistor ST6 are off, the second transistor ST2, the fourth transistor ST4 and the fifth transistor ST5 are on, and the reference voltage signal Vref is written into the gate electrode of the drive transistor DTFT through the fifth transistor ST5, the second transistor ST2 and the fourth transistor ST4 to ensure that the drive transistor DTFT is in the on state in a data write stage T2. The reference voltage signal Vref is written into the anode of the light emission device OLED through the fifth transistor ST5, and the reference voltage signal Vref initializes the anode of the light emission device OLED.

In the data write stage T2, the first light emission control signal EM1, the second light emission control signal EM2 and the initialization control signal Scan are at a high level, and the first scanning signal Scan1 and the second scanning signal Scan2 are at a low level. The first transistor ST1, the second transistor ST2 and the third transistor ST3 are off. The fourth transistor ST4 and the fifth transistor ST5 are on so as to write the data signal DATA into the gate electrode of the drive transistor DTFT. The sixth transistor ST6 continues to be on, and the reference voltage signal Vref continues to be written into the anode of the light emission device OLED.

In a light emission stage T3, the initialization control signal Scan, the first scanning signal Scan1 and the second scanning signal Scan2 are at a high level, and the first light emission control signal EM1 and the second light emission control signal EM2 are at a low level. The third transistor ST3, the fourth transistor ST4, the fifth transistor ST5 and the sixth transistor ST6 are off. The first transistor ST1 and the second transistor ST2 are on, and the drive transistor DTFT generates a drive current to flow into the anode of the light emission device OLED to drive the light emission device OLED to emit light.

In one embodiment, in a structure of the pixel circuit shown in FIG. 11, the first power signal ELVDD or the second light emission control signal EM2 may be multiplexed as the initialization voltage signal Vin.

Figure 13:
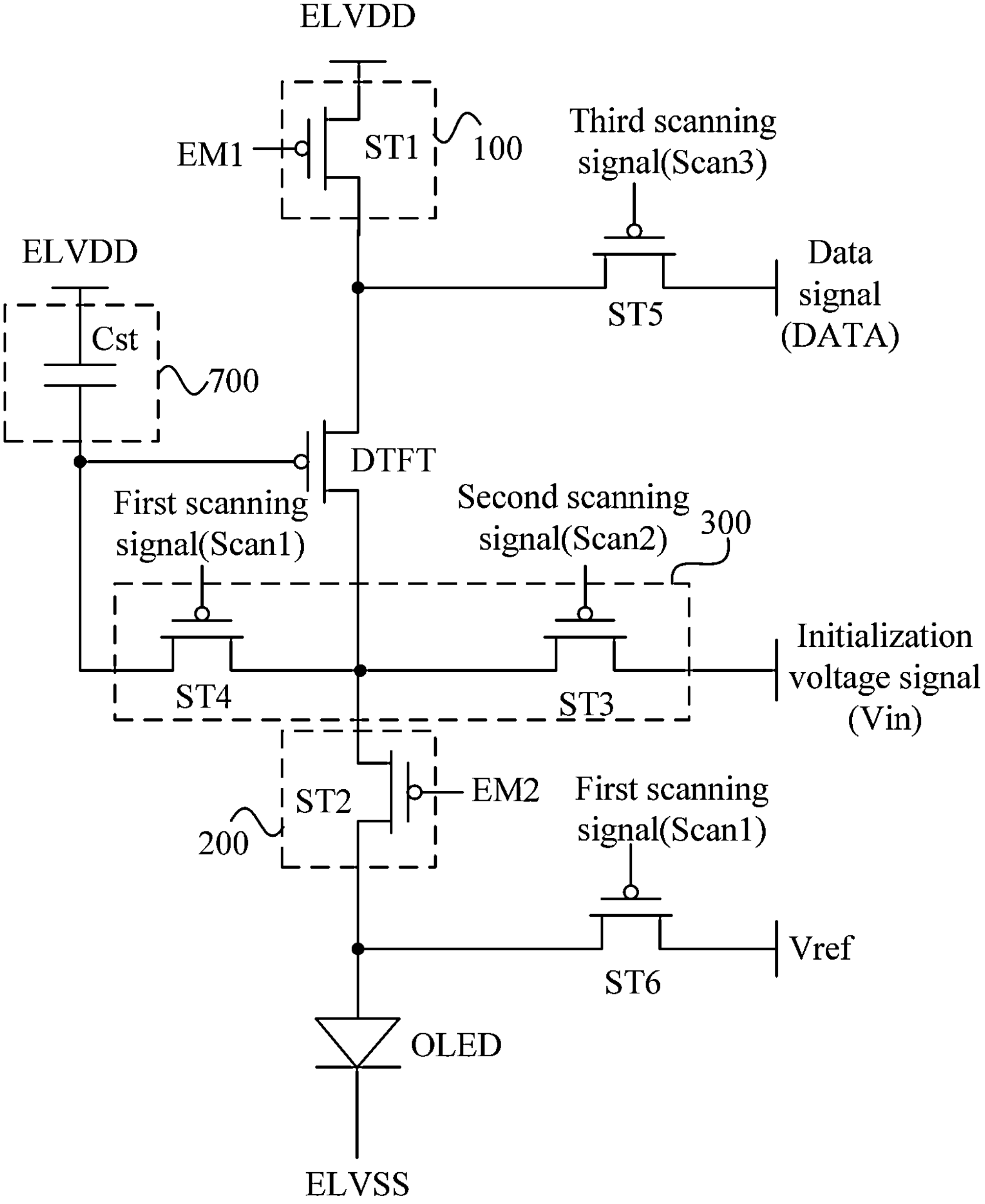
FIG. 13 is a circuit diagram of another pixel circuit according to one embodiment.

FIG. 13 is a circuit diagram of another pixel circuit according to one embodiment. Referring to FIG. 13, in one embodiment, the first light emission control module 100 includes a first transistor ST1, a gate electrode of the first transistor ST1 is electrically connected with the first light emission control signal EM1, a first electrode of the first transistor ST1 is electrically connected with the first power signal ELVDD, and a second electrode of the first transistor ST1 is electrically connected to the first electrode of the drive transistor DTFT.

The second light emission control module 200 includes a second transistor ST2, a gate electrode of the second transistor ST2 is electrically connected with the second light emission control signal EM2, a first electrode of the second transistor ST2 is electrically connected to the second electrode of the drive transistor DTFT, and a second electrode of the second transistor ST2 is electrically connected to the anode of the light emission device OLED.

The initialization control signal includes a first scanning signal Scan1 and a second scanning signal Scan2, and the gate initialization module 300 includes a third transistor ST3 and a fourth transistor ST4. The gate electrode of the third transistor ST3 is electrically connected with the second scanning signal Scan2, a first electrode of the third transistor ST3 is electrically connected with the initialization voltage signal Vin, and a second electrode of the third transistor ST3 is electrically connected to the second electrode of the drive transistor DTFT. The gate electrode of the fourth transistor ST4 is electrically connected with the first scanning signal Scan1, a first electrode of the fourth transistor ST4 is electrically connected to the second electrode of the drive transistor DTFT, and a second electrode of the fourth transistor ST4 is electrically connected to the gate electrode of the drive transistor DTFT.

This embodiment implements more functions by using fewer transistors. The fourth transistor ST4 is not only used as a transistor in the gate initialization module 300, but also may be multiplexed as a transistor in a data write module 600 and may further be multiplexed as a transistor in the second gate initialization module 400.

Referring to FIG. 13, in one embodiment, the pixel circuit further may include a fifth transistor ST5, where a gate electrode of the fifth transistor ST5 is electrically connected with the third scanning signal Scan3, a first electrode of the fifth transistor ST5 is electrically connected with the data signal DATA, and a second electrode of the fifth transistor ST5 is electrically connected to the first electrode of the drive transistor DTFT. The fourth transistor ST4 and the fifth transistor ST5 constitute a data write module 600, so that the fourth transistor ST4 is multiplexed as a transistor in the data write module 600, which is beneficial to reduce the number of transistors in the pixel circuit.

Referring to FIG. 13, in one embodiment, the pixel circuit further may include a sixth transistor ST6, where a gate electrode of the sixth transistor ST6 is electrically connected with the first scanning signal Scan1, a first electrode of the sixth transistor ST6 is electrically connected with the reference voltage signal Vref, and a second electrode of the sixth transistor ST6 is electrically connected to the anode of the light emission device OLED. The fourth transistor ST4 and the sixth transistor ST6 constitute the second gate initialization module 400, so that the fourth transistor ST4 is multiplexed as a transistor in the second gate initialization module 400 and the sixth transistor ST6 is further multiplexed as a transistor in the anode initialization module 500, which are beneficial to reduce the number of transistors in the pixel circuit.

The pixel circuit is a 7T1C circuit, where the fourth transistor ST4 is not only used as a transistor in the data write module 600, but also may be multiplexed as a transistor in the gate initialization module 300 and may further be multiplexed as a transistor of the second gate initialization module 400. The sixth transistor ST6 is not only used as a transistor in the gate initialization module, but also multiplexed as a transistor in the anode initialization module 500. Therefore, this embodiment implements more functions by using fewer transistors.

Figure 14:
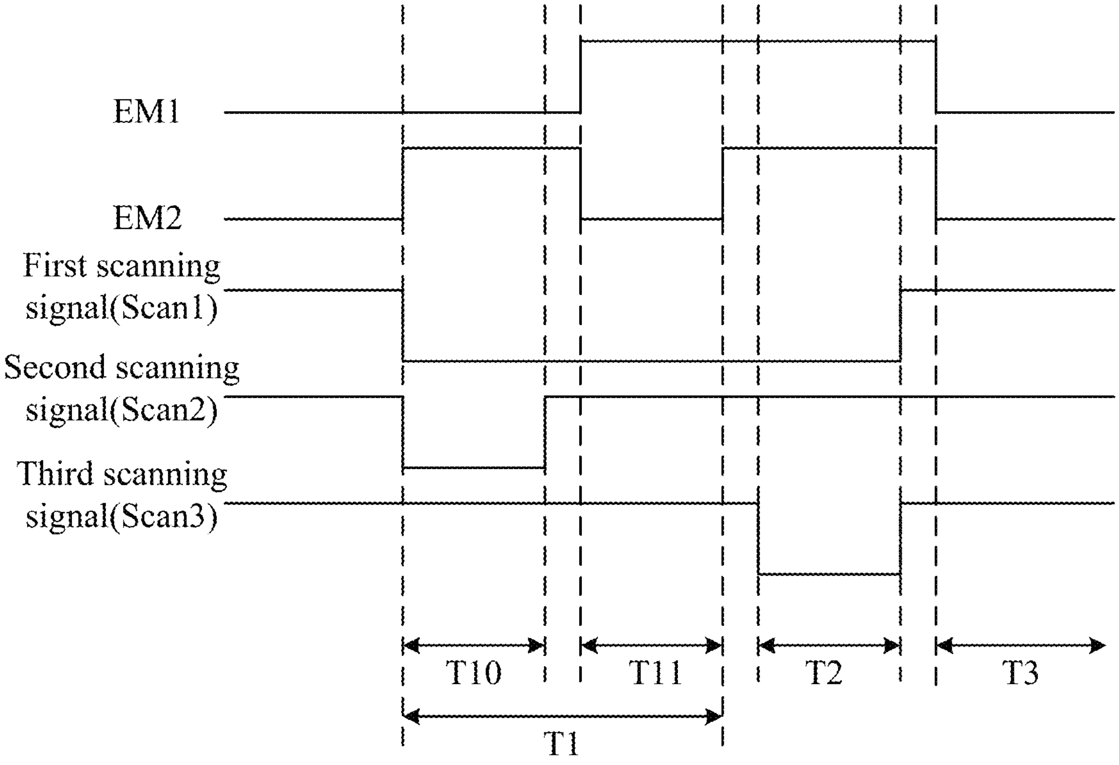
FIG. 14 is a driving timing diagram of the pixel circuit in FIG. 13.

FIG. 14 is a driving timing diagram of the pixel circuit in FIG. 13. Referring to FIGS. 13 to 14, the driving process of the pixel circuit is as follows.

An initialization stage T1 includes a first stage T10 and a second stage T11. In the first stage T10, the second light emission signal EM2 and the third scanning signal Scan3 are at a high level, and the first light emission control signal EM1, the first scanning signal Scan1 and the second scanning signal Scan2 are at a low level. The second transistor ST2 and the fifth transistor ST5 are off, and the first transistor ST1, the third transistor ST3, the fourth transistor ST4 and the sixth transistor ST6 are on. The first power signal ELVDD initializes the source electrode of the drive transistor DTFT, the initialization voltage signal Vin initializes the gate electrode of the drive transistor DTFT, and the reference voltage signal Vref initializes the anode of the light emission device OLED.

In the second stage T11, the first light emission control signal EM1 the second scanning signal Scan2 and the third scanning signal Scan3 are at a high level, and the second light emission control signal EM2 and the first scanning signal Scan1 are at a low level. The first transistor ST1, the third transistor ST3 and the fifth transistor ST5 are off, the second transistor ST2, the fourth transistor ST4 and the sixth transistor ST6 are on, and the reference voltage signal Vref is written into the gate electrode of the drive transistor DTFT to ensure that the drive transistor DTFT is in the on state in the data write stage T2. At the same time, the reference voltage signal Vref continues to be written into the anode of the light emission device OLED through the sixth transistor ST6.

In the data write stage T2, the first light emission control signal EM1, the second light emission control signal EM2 and the second scanning signal Scan2 are at a high level, and the first scanning signal Scan1 and the third scanning signal Scan3 are at a low level. The first transistor ST1, the second transistor ST2 and the third transistor ST3 are off. The fourth transistor ST4 and the fifth transistor ST5 are on so as to write the data signal DATA into the gate electrode of the drive transistor DTFT. At the same time, the reference voltage signal Vref continues to be written into the anode of the light emission device OLED.

In a light emission stage T3, the first scanning signal Scan1, the second scanning signal Scan2 and the third scanning signal Scan3 are at a high level, and the first light emission control signal EM1 and the second light emission control signal EM2 are at a low level. The third transistor ST3, the fourth transistor ST4, the fifth transistor ST5 and the sixth transistor ST6 are off. The first transistor ST1 and the second transistor ST2 are on, and the drive transistor DTFT generates a drive current to flow into the anode of the light emission device OLED so as to drive the light emission device OLED to emit light.

In one embodiment, in a structure of the pixel circuit shown in FIG. 13, the first power signal ELVDD or the second light emission control signal EM2 may be multiplexed as the initialization voltage signal Vin.

Figure 15:
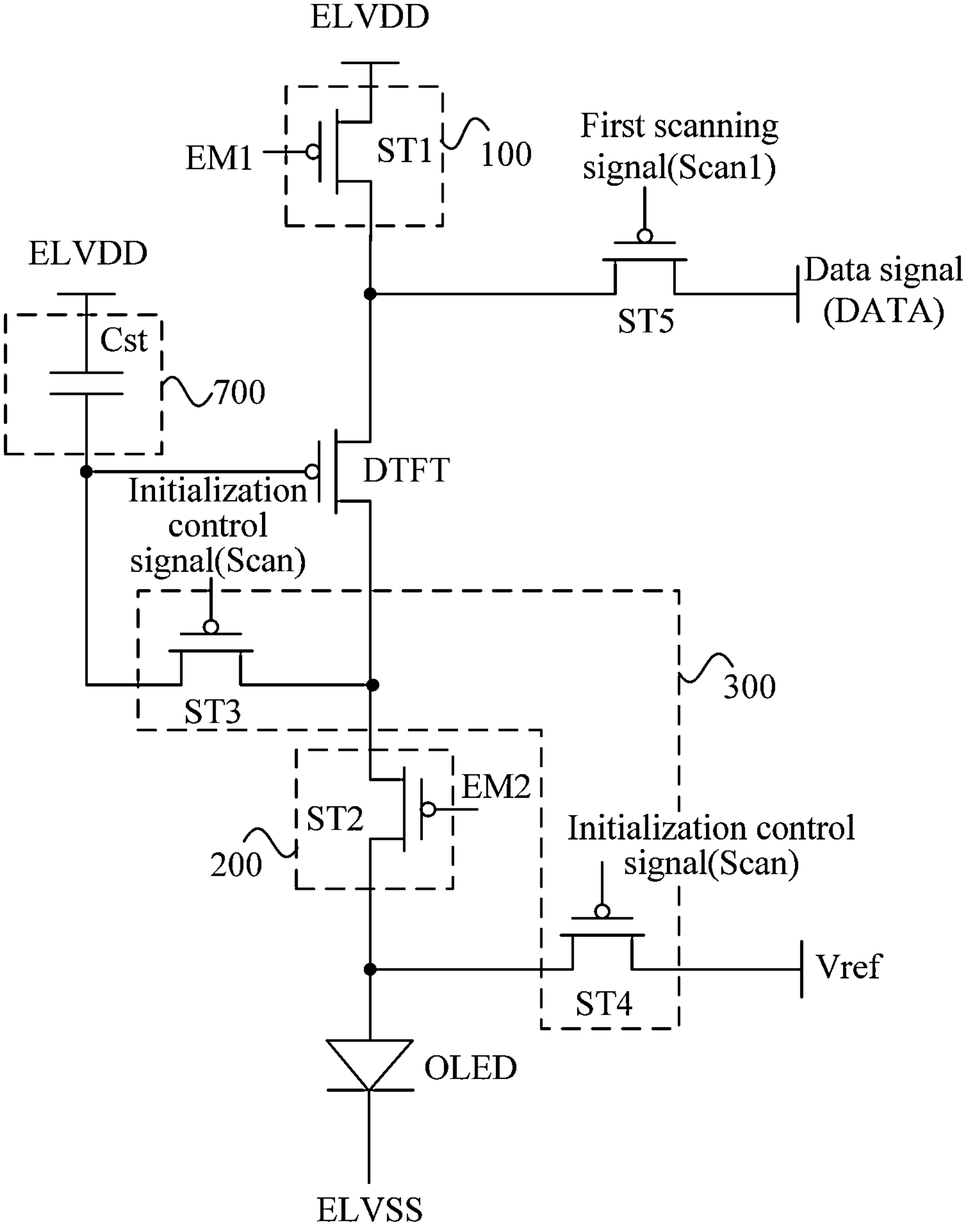
FIG. 15 is a circuit diagram of another pixel circuit according to one embodiment.

FIG. 15 is a circuit diagram of another pixel circuit according to one embodiment. Referring to FIG. 15, in one embodiment, the first light emission control module 100 may include a first transistor ST1, a gate electrode of the first transistor ST1 is electrically connected with the first light emission control signal EM1, a first electrode of the first transistor ST1 is electrically connected with the first power signal ELVDD, and a second electrode of the first transistor ST1 is electrically connected to the first electrode of the drive transistor DTFT.

The second light emission control module 200 includes a second transistor ST2, a gate electrode of the second transistor ST2 is electrically connected with the second light emission control signal EM2, a first electrode of the second transistor ST2 is electrically connected to the second electrode of the drive transistor DTFT, and a second electrode of the second transistor ST2 is electrically connected to an anode of the light emission device OLED.

The gate initialization module 300 includes a third transistor ST3 and a fourth transistor ST4, a gate electrode of the third transistor ST3 is electrically connected with the initialization control signal Scan, a first electrode of the third transistor ST3 is electrically connected to the second electrode of the drive transistor DTFT, and a second electrode of the third transistor ST3 is electrically connected to the gate electrode of the drive transistor DTFT. A gate electrode of the fourth transistor ST4 is electrically connected with the initialization control signal Scan, a first electrode of the fourth transistor ST4 is electrically connected with the reference voltage signal Vref, and a second electrode of the fourth transistor ST4 is electrically connected to the anode of the light emission device OLED.

This embodiment implements more functions by using fewer transistors, where the fourth transistor ST4 is not only used as a transistor in the anode initialization module 500, but also multiplexed as a transistor in the gate initialization module 300. In addition, this embodiment is equivalent to multiplexing the reference voltage signal Vref as the initialization voltage signal, and in the first stage T10 of the initialization stage T1, the drive transistor DTFT achieves an on-state bias.

Referring to FIG. 15, the pixel circuit further may include a fifth transistor ST5, where a gate electrode of the fifth transistor ST5 is electrically connected with the first scanning signal Scan1, a first electrode of the fifth transistor ST5 is electrically connected with the data signal DATA, and a second electrode of the fifth transistor ST5 is electrically connected to the first electrode of the drive transistor DTFT.

The pixel circuit is a 6T1C circuit and implements more functions by using fewer transistors. The third transistor ST3 is not only used as a transistor in the data write module 600, but also multiplexed as a transistor in the gate initialization module 300. The fourth transistor ST4 is not only used as a transistor in the anode initialization module 500, but also multiplexed as a transistor in the gate initialization module 300. Compared with other embodiments, this embodiment uses the least number of transistors and may be applied to products with high PPI.

Figure 16:
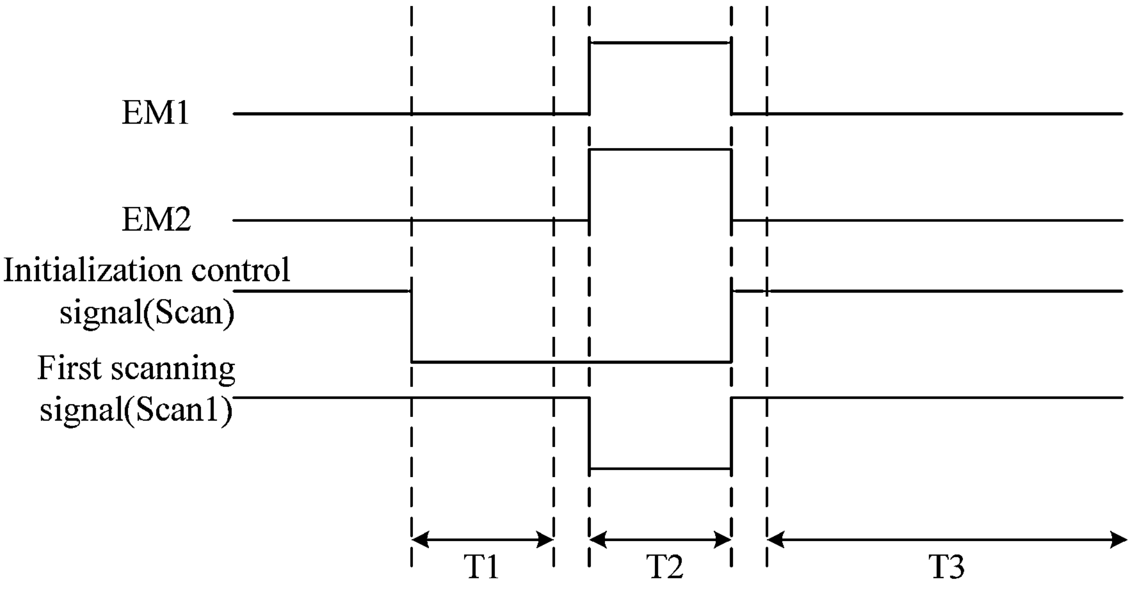
FIG. 16 is a driving timing diagram of the pixel circuit in FIG. 15.

FIG. 16 is a driving timing diagram of the pixel circuit in FIG. 15. Referring to FIGS. 15 to 16, the driving process of the pixel circuit is as follows.

In the initialization stage T1, the first scanning signal Scan1 is at a high level, the first light emission control signal EM1, the second light emission control signal EM2 and the initialization control signal Scan are at a low level. The fifth transistor ST5 is off, the first transistor ST1, the second transistor ST2, the third transistor ST3 and the fourth transistor ST4 are on, the first power signal ELVDD initializes the source electrode of the drive transistor DTFT, and the reference voltage signal Vref initializes the gate electrode of the drive transistor DTFT and the anode of the light emission device OLED.

In the data write stage T2, the first light emission control signal EM1 and the second light emission control signal EM2 are at a high level, and the initialization control signal Scan and the first scanning signal Scan1 are at a low level. The first transistor ST1 and the second transistor ST2 are off. The third transistor ST3 and the fifth transistor ST5 are on so as to write the data signal DATA into the gate electrode of the drive transistor DTFT. The fourth transistor ST4 continues to be on, and the reference voltage signal Vref continues to be written into the anode of the light emission device OLED.

In the light emission stage T3, the initialization control signal Scan and the first scanning signal Scan1 are at a high level, and the first light emission control signal EM1 and the second light emission control signal EM2 are at a low level. The third transistor ST3, the fourth transistor ST4 and the fifth transistor ST5 are off. The first transistor ST1 and the second transistor ST2 are on, and the drive transistor DTFT generates a drive current to flow into the anode of the light emission device OLED to drive the light emission device OLED to emit light.

In the pixel circuit structure provided shown in FIG. 15, the first light emission control module 100 and the second light emission control module 200 are controlled by the first light emission control signal EM1 and the second light emission control signal EM2, respectively, which is not to limit the present disclosure. In other embodiments, in the pixel circuit structure shown in FIG. 15, the first light emission control module 100 and the second light emission control module 200 may be provided to be controlled by a same light emission control signal.

Figure 17:
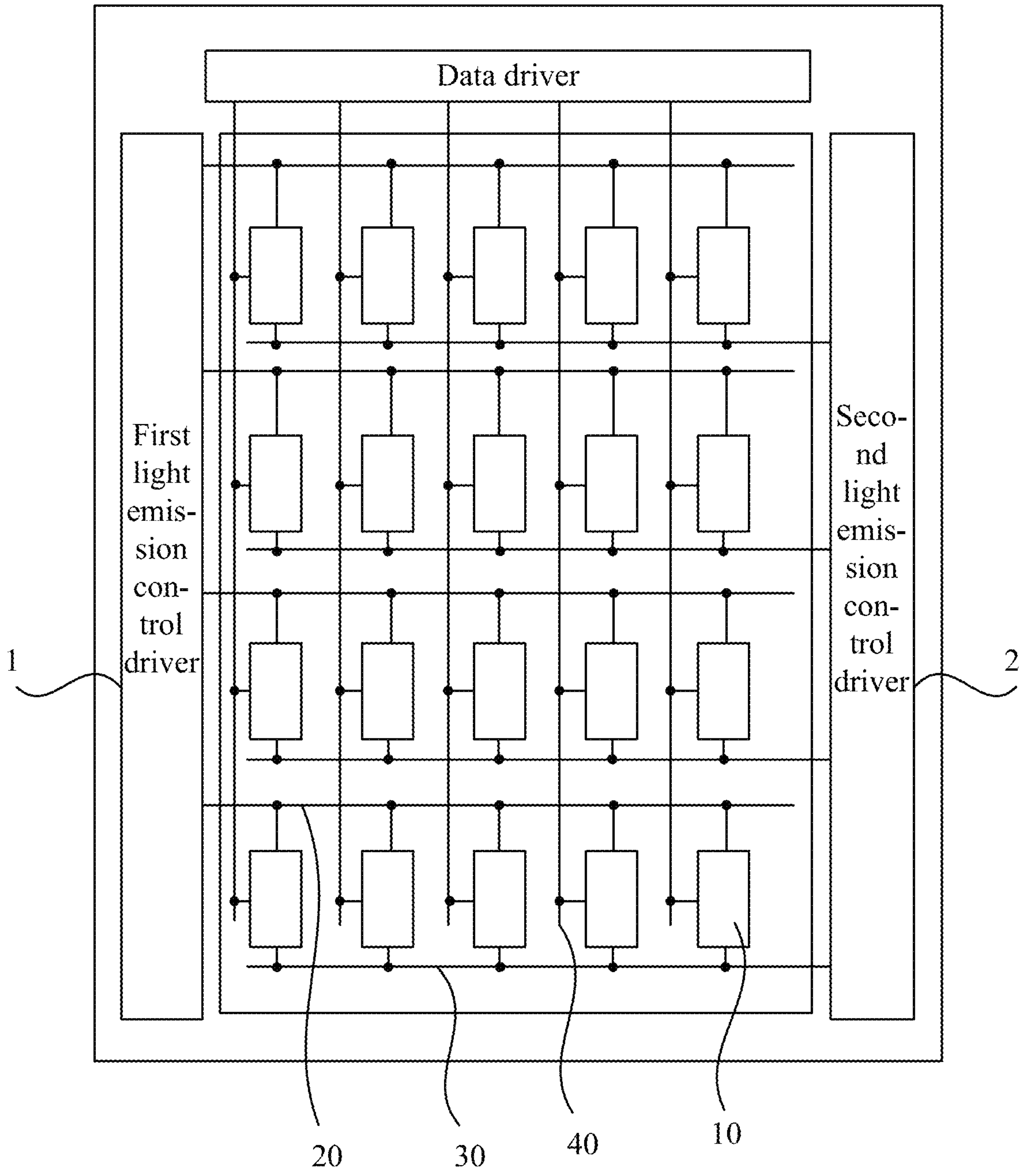
FIG. 17 is a structural diagram of a display panel according to one embodiment.

An embodiment further provides a display panel. FIG. 17 is a structural diagram of a display panel according to one embodiment. Referring to FIG. 17, the display panel includes the pixel circuit in any one of embodiments, and its technical principles and technical effects are similar, and will not be described herein.

Referring to FIG. 17, the display panel further may include a plurality of first light emission control signal lines 20, a plurality of second light emission control signal lines 30 and a plurality of data lines 40. The plurality of first light emission control signal lines 20 provide a first light emission control signal to the pixel circuit 10, the plurality of second light emission control signal lines 30 provide a second light emission control signal to the pixel circuit 10, and the plurality of data lines 40 provide a data signal to the pixel circuit 10.

Referring to FIG. 17, the display panel may further include a first light emission control driver 1 and a second light emission control driver 2, where the first light emission control driver 1 and the second light emission control driver 2 are located on a non-display region of the display panel. The plurality of first light emission control signal lines 20 are electrically connected to the first light emission control driver 1, and the first light emission control driver 1 provides the first light emission control signal. The plurality of second light emission control signal lines 30 are electrically connected to the second light emission control driver 2, and the second light emission control driver 2 provides the second light emission control signal. In this embodiment, the first light emission control driver 1 and the second light emission control driver 2 are configured to provide light emission control signals, respectively.

Figure 18:
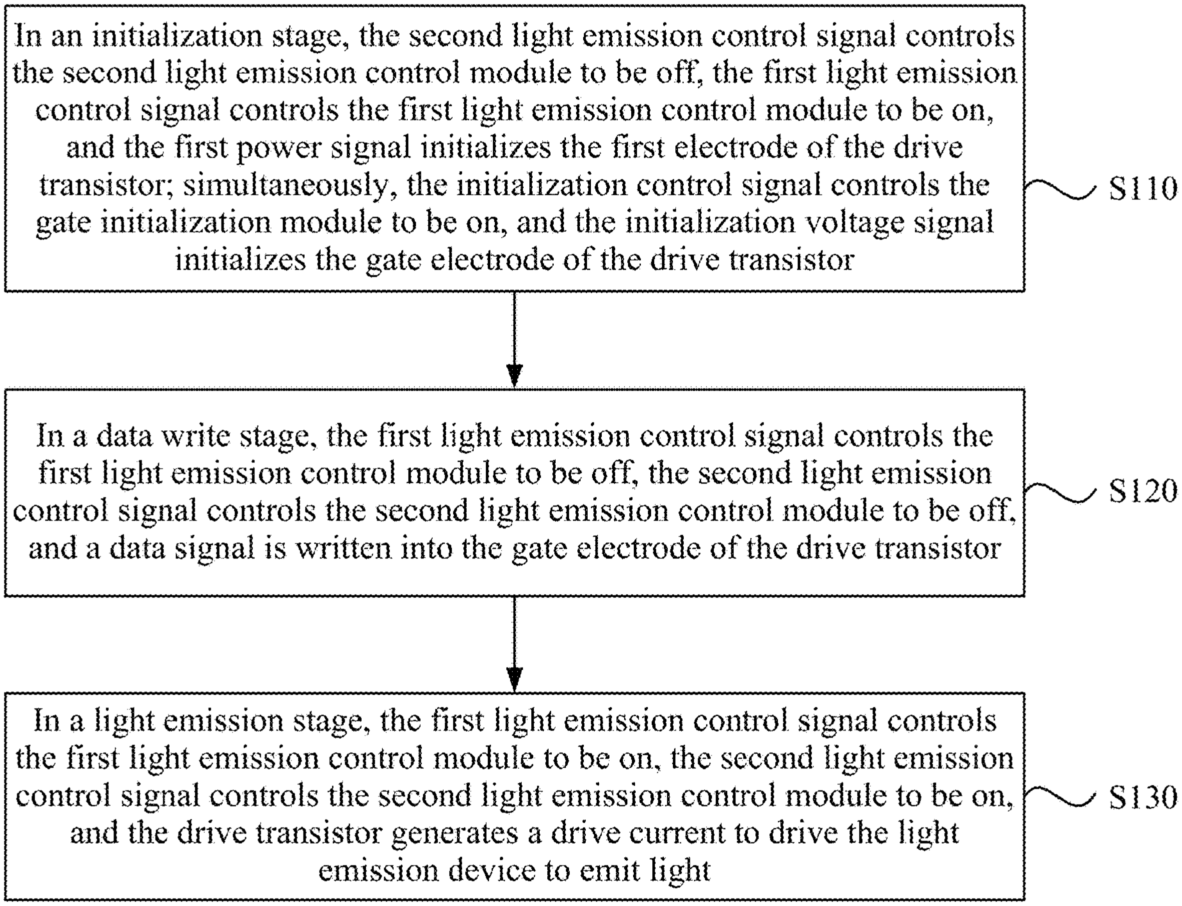
FIG. 18 is a flowchart of a method for driving a pixel circuit according to one embodiment.

A method for driving a pixel circuit is further provided in this embodiment and applied to the pixel circuit of any one of embodiments. FIG. 18 is a flowchart of a method for driving a pixel circuit according to one embodiment. Referring to FIG. 18, the method for driving the pixel circuit includes the steps described below.

In step S110, in an initialization stage, the second light emission control signal controls the second light emission control module to be off, the first light emission control signal controls the first light emission control module to be on, and the first power signal initializes the first electrode of the drive transistor; simultaneously, the initialization control signal controls the gate initialization module to be on, and the initialization voltage signal initializes the gate electrode of the drive transistor.

In step S120, in a data write stage, the first light emission control signal controls the first light emission control module to be off, the second light emission control signal controls the second light emission control module to be off, and a data signal is written into the gate electrode of the drive transistor.

In step S130, in a light emission stage, the first light emission control signal controls the first light emission control module to be on, the second light emission control signal controls the second light emission control module to be on, and the drive transistor generates a drive current to drive the light emission device to emit light.

This embodiment provides the method for driving the pixel circuit, the step in which the gate electrode and the source electrode of the drive transistor are initialized at the same time is added, and the timing of the first light emission control signal and the timing of the second light emission control signal are different, so that the first light emission control module and the second light emission control module can be on and off in different stages. This embodiment ensures that the first light emission control module is on and the second light emission control module is off while the gate initialization module is on, so as to initialize the gate electrode and the source electrode of the drive transistor at the same time. That is, when the gate electrode of the drive transistor is electrically connected with a fixed potential, a fixed potential is also accessed to the source electrode of the drive transistor, and the gate electrode and the source electrode of the drive transistor in different working states in a previous frame are forced to reset at the same time, so that the drive transistor can be fully reset, and the working states of the drive transistor are consistent in the subsequent stages, thus improving the image-sticking phenomenon of the display panel.

What is claimed is:

1. A pixel circuit, comprising:

a drive transistor comprising a gate electrode, a first electrode and a second electrode;

a first light emission control module comprising a first transistor, a gate electrode of the first transistor electrically connected with a first light emission control signal, a first electrode of the first transistor is electrically connected with a first power signal, and a second electrode of the first transistor is electrically connected to the first electrode of the drive transistor;

a second light emission control module comprising a second transistor, a gate electrode of the second transistor is electrically connected with a second light emission control signal, a first electrode of the second transistor is electrically connected to the second electrode of the drive transistor, and a second electrode of the second transistor is electrically connected to an anode of a light emission device;

a gate initialization module comprising a third transistor, a gate electrode of the third transistor is electrically connected with an initialization control signal, a first electrode of the third transistor is electrically connected with an initialization voltage signal, and a second electrode of the third transistor is electrically connected to the gate electrode the drive transistor;

a second gate initialization module comprising a fourth transistor, a gate electrode of the fourth transistor is electrically connected with a first scanning signal, a first electrode of the fourth transistor is electrically connected to the second electrode of the drive transistor, and a second electrode of the fourth transistor is electrically connected to the gate electrode of the drive transistor;

an anode initialization module comprising a fifth transistor, a first electrode of the fifth transistor is electrically connected with a reference voltage signal and a second electrode of the fifth transistor is electrically connected to the second electrode of the drive transistor; and a data write module comprising a sixth transistor, a gate electrode of the sixth transistor is electrically connected with a third scanning signal, a first electrode of the sixth transistor is electrically connected with a data signal, and a second electrode of the sixth transistor is electrically connected to the first electrode of the drive transistor;

wherein the fourth transistor is multiplexed as a transistor in the data write module such that the pixel circuit is a 7T1C circuit provided with at most seven transistors, including the drive transistor.

2. The pixel circuit of claim 1, wherein the fifth transistor is multiplexed as a transistor in the second gate initialization module.

3. The pixel circuit of claim 1, wherein a gate electrode of the fifth transistor is electrically connected with a second scanning signal.

4. The pixel circuit of claim 3, wherein the first scanning signal is multiplexed as the initialization control signal, or the second scanning signal is multiplexed as the initialization control signal.

5. The pixel circuit of claim 1, wherein a gate electrode of the fifth transistor is electrically connected with the first scanning signal.

6. A display panel comprising the pixel circuit of claim 1.

7. The display panel of claim 6, further comprising a plurality of first light emission control signal lines, a plurality of second light emission control signal lines and a plurality of data lines;

wherein each of the plurality of first light emission control signal lines is configured to provide a first light emission control signal to the pixel circuit, each of the plurality of second light emission control signal lines is configured to provide a second light emission control signal to the pixel circuit, and each of the plurality of data lines is configured to provide a data signal to the pixel circuit.

8. The display panel of claim 7, further comprising a first light emission control driver and a second light emission control driver, wherein the first light emission control driver and the second light emission control driver are located in a non-display region of the display panel, the plurality of first light emission control signal lines are electrically connected to the first light emission control driver, the first light emission control driver is configured to provide the first light emission control signal, the plurality of second light emission control signal lines are electrically connected to the second light emission control driver, and the second light emission control driver is configured to provide the second light emission control signal.

9. A method for driving the pixel circuit of claim 1, comprising:

in an initialization stage, controlling, by the second light emission control signal, the second light emission control module to be off; controlling, by the first light emission control signal, the first light emission control module to be on, and initializing, by the first power signal, the first electrode of the drive transistor; simultaneously, controlling, by the initialization control signal, the gate initialization module to be on, and initializing, by the initialization voltage signal, the gate electrode of the drive transistor;

in a data write stage, controlling, by the first light emission control signal, the first light emission control module to be off; controlling, by the second light emission control signal, the second light emission control module to be off; and writing a data signal into the gate electrode of the drive transistor; and in a light emission stage, controlling, by the first light emission control signal, the first light emission control module to be on; controlling, by the second light emission control signal, the second light emission control module to be on; and generating, by the drive transistor, a drive current to drive the light emission device to emit light.

10. A pixel circuit, comprising:

a drive transistor comprising a gate electrode, a first electrode and a second electrode;

a first light emission control module comprising a first transistor, a gate electrode of the first transistor is electrically connected with a first light emission control signal, a first electrode of the first transistor is electrically connected with a first power signal, and a second electrode of the first transistor is electrically connected to the first electrode of the drive transistor;

a second light emission control module comprising a second transistor, a gate electrode of the second transistor is electrically connected with a second light emission control signal, a first electrode of the second transistor is electrically connected to the second electrode of the drive transistor, and a second electrode of the second transistor is electrically connected to an anode of a light emission device;

a gate initialization module comprising a third transistor and a fourth transistor; a gate electrode of the third transistor is electrically connected with a second scanning signal, a first electrode of the third transistor is electrically connected with an initialization voltage signal, and a second electrode of the third transistor is electrically connected to the second electrode of the drive transistor; and a gate electrode of the fourth transistor is electrically connected with a first scanning signal, a first electrode of the fourth transistor is electrically connected to the second electrode of the drive transistor, and a second electrode of the fourth transistor is electrically connected to the gate electrode of the drive transistor;

a data write module comprising a fifth transistor, a gate electrode of the fifth transistor is electrically connected with a third scanning signal, a first electrode of the fifth transistor is electrically connected with a data signal, and a second electrode of the fifth transistor is electrically connected to the first electrode of the drive transistor; and a second gate initialization module comprising a sixth transistor, a gate electrode of the sixth transistor is electrically connected with the first scanning signal, a first electrode of the sixth transistor is electrically with a reference voltage signal, and a second electrode of the fifth transistor is electrically connected to the second electrode of the drive transistor;

wherein the initialization control signal comprises the first scanning signal and a second scanning signal, wherein the fourth transistor is multiplexed as a transistor in the data write module and the second gate initialization module, and wherein the sixth transistor is multiplexed as a transistor in the gate initialization module and an anode initialization module such that the pixel circuit is a 7T1C circuit provided with at most seven transistors, including the drive transistor.

11. The pixel circuit of claim 1, wherein the first power signal is multiplexed as the initialization voltage signal, or the second light emission control signal is multiplexed as the initialization voltage signal.

12. A pixel circuit, comprising:

a drive transistor comprising a gate electrode, a first electrode and a second electrode;

a first light emission control module comprising a first transistor, a gate electrode of the first transistor is electrically connected with a first light emission control signal, a first electrode of the first transistor is electrically connected with a first power signal, and a second electrode of the first transistor is electrically connected to the first electrode of the drive transistor;

a second light emission control module comprising a second transistor, a gate electrode of the second transistor is electrically connected with a second light emission control signal, a first electrode of the second transistor is electrically connected to the second electrode of the drive transistor, and a second electrode of the second transistor is electrically connected to an anode of a light emission device; and a gate initialization module comprising a third transistor and a fourth transistor, a gate electrode of the third transistor is electrically connected with an initialization control signal, a first electrode of the third transistor is electrically connected to the second electrode of the drive transistor, and a second electrode of the third transistor is electrically connected to the gate electrode of the drive transistor; and a gate electrode of the fourth transistor is electrically connected with the initialization control signal, a first electrode of the fourth transistor is electrically connected with a reference voltage signal, and a second electrode of the fourth transistor is electrically connected to an anode of the light emission device; and a data write module comprising a fifth transistor, a gate electrode of the fifth transistor is electrically connected with a first scanning signal, a first electrode of the fifth transistor is electrically connected with a data signal, and a second electrode of the fifth transistor is electrically connected to the first electrode of the drive transistor, wherein the fourth transistor is multiplexed as a transistor in an anode initialization module, wherein the third transistor is multiplexed as a transistor in the data write module, such that the pixel is a 6T1C circuit provided with at most six transistors, including the drive transistor.

13. The pixel circuit of claim 12 wherein the reference voltage signal is multiplexed as the initialization voltage signal.

* * * * *